US006891626B2

US 6,891,626 B2

(12) United States Patent
Niu et al.

(10) Patent No.: US 6,891,626 B2
(45) Date of Patent: May 10, 2005

(54) CACHING OF INTRA-LAYER CALCULATIONS FOR RAPID RIGOROUS COUPLED-WAVE ANALYSES

(75) Inventors: Xinhui Niu, San Jose, CA (US); Nickhil Harshavardhan Jakatdar, Los Altos, CA (US)

(73) Assignee: Timbre Technologies, Inc., Santa Clara, CA (US)

( * ) Notice: Subject to any disclaimer, the term of this patent is extended or adjusted under 35 U.S.C. 154(b) by 330 days.

(21) Appl. No.: 09/770,997

(22) Filed: Jan. 25, 2001

(65) Prior Publication Data

US 2002/0033954 A1 Mar. 21, 2002

Related U.S. Application Data

(60) Provisional application No. 60/178,910, filed on Jan. 26, 2000.

(51) Int. Cl.[7] .............................................. G01B 11/14
(52) U.S. Cl. .......................................... 356/625; 703/6
(58) Field of Search ................................ 356/625, 328, 356/601; 702/57, 66, 81, 155; 703/6

(56) References Cited

U.S. PATENT DOCUMENTS

| | | | |
|---|---|---|---|
| 5,131,752 A | 7/1992 | Yu et al. | |
| 5,164,790 A | 11/1992 | McNeil et al. | |
| 5,452,953 A | * 9/1995 | Ledger ....................... | 356/632 |
| 5,607,800 A | 3/1997 | Ziger | |
| 5,739,909 A | 4/1998 | Blayo et al. | |
| 5,835,225 A | 11/1998 | Thakur | |
| 5,867,276 A | 2/1999 | McNeil et al. | |
| 5,963,329 A | 10/1999 | Conrad et al. | |

OTHER PUBLICATIONS

N. W. Ashcroft et al., "Solid State Physics", Saunders College Philadelphia, 1976, pp. 133–135.
R. M. A. Azzam et al., "Ellipsometry and Polarized Light", Elsevier Science B. V., 1987, book.
Ch. M. Bishop, "Neural Networks for Pattern Recognition", Ch. 4, 1995, pp. 117–161.
S. Bushman et al., "Scatterometry Measurements for Process Monitoring of Gate Etch", AEC/APC Workshop IX, Sematech, Sep. 20–24, 1997, pp. 148–158.

(Continued)

Primary Examiner—Gregory J. Toatley, Jr.
Assistant Examiner—Roy M. Punnoose
(74) Attorney, Agent, or Firm—Morrison & Foerster

(57) ABSTRACT

A library of simulated-diffraction signals for an integrated circuit periodic grating is generated by generating gets of intermediate layer data. Each set of intermediate layer data corresponding to a separate one of a plurality of hypothetical layers of a hypothetical profile of the periodic grating. Each separate hypothetical layer has one of a plurality of possible combinations of hypothetical values of properties for that hypothetical layer. The generated sets of intermediate layer data are stored. Simulated-diffraction signals for each of a plurality of hypothetical profiles are generated based on the stored generated sets of intermediate layer data.

32 Claims, 13 Drawing Sheets

OTHER PUBLICATIONS

G. Granet et al., "Efficient implementation of the coupled-wave method for metallic lamellar in TM polarization", J. Opt. Soc. Am. vol. 13, no. 5, May 1996, pp. 1019–1023.

O. S. Heavens, "Optical Properties of Thin Solid Films", Dover Publications, Inc. 1955, book.

P. Lalanne et al., "Highly improved convergence of the coupled–wave method for TM polarization", J. Opt. Soc. Am. vol. 13, no. 4, Apr. 1996, pp. 779–784.

L. Li et al., "Convergence of the coupled–wave method for metallic lamellar diffraction gratings", J. Opt. Soc. Am. vol. 10, no. 6, Jun. 1993, pp. 1184–1189.

D. Maystre, "A new general integral theory for dielectric coated gratings", J. of Opt. Soc. of Amer. vol. 68 (4), Apr. 78, pp. 189–194.

M. G. Moharam et al., "Rigorous coupled–wave analysis of planar–grating diffraction", J. Opt. Soc. Am. vol. 71, no. 7/Jul. 1981, pp. 811–818.

M. G. Moharam et al., "Formulation for stable and efficient implementation of the rigorous coupled–wave analysis of binary gratings", J. Opt. Soc. Am. vol. 12, no. 5, May 1995, pp. 1068–1076.

Moharam et al., "Stable implementation of the rigorous coupled–wave analysis for surface—relief gratings: enhanced transmittance matrix approach", J. Opt. Soc. Am. vol. 12, no. 5, May 1995, pp. 1077–1086.

M. Neviere et al., "Systematic Study of Resonances of Holographic Thin Film Couplers", Optics Com. vol. 9 (1), 1973, pp. 205–209.

A. R. Neureuther et al., "Numerical Methods for the Analysis of Scattering from Nonplanar Periodic Structures", URSI Symposium on Electromag. Waves, 1969, pp. 185–188.

W. H. Press et al., "Numerical Recipes in C", Art of Scien. Computing 2nd Ed., 1986, pp. 29–38.

J. A. Rice, "Mathematical Statistics and Data Analysis" sec. ed., ch. 14, Duxbury Press, 1995, pp. 507–570.

* cited by examiner

CACHING OF INTRA-LAYER CALCULATIONS FOR RAPID RIGOROUS COUPLED-WAVE ANALYSES

RELATED DOCUMENTS

The present patent application claims the benefit of provisional patent application Ser. No. 60/178,910, filed Jan. 26, 2000, by Xinhui Niu and Nickhil Harshavardhan Jakatdar, entitled Cached Coupled Wave Method for Diffraction Grating Profile Analysis.

BACKGROUND OF THE INVENTION

The present invention relates generally to the measurement of complete profiles of one-dimensionally and two-dimensionally repeating, regularly-spaced series of structures through the use of an algorithm for caching of intermediate results, and the use of cached intermediate results to increase the efficiency of calculations. The present invention also relates to coupled wave analyses of diffracted electromagnetic signals from periodic gratings, particularly where the diffracted electromagnetic signals are monitored by optical metrology tools, such as reflectometer and ellipsometers. More particularly, the present invention relates to apparatus and methods for measurement of complete profiles of one-dimensionally and two-dimensionally repeating, regularly-spaced series of structures and to reducing the computation time of coupled wave analyses of diffraction from periodic gratings, and still more particularly the present invention relates to apparatus and methods for caching and retrieval of intermediate computations to reduce the computation time of coupled wave analyses of diffraction from periodic gratings.

Diffraction gratings have been used in spectroscopic applications, i.e., diffraction applications utilizing multiple wavelengths, such as optical instruments, space optics, synchrotron radiation, in the wavelength range from visible to x-rays. Furthermore, the past decades have seen the use of diffraction gratings in a wide variety of nonspectroscopic applications, such as wavelength selectors for tunable lasers, beam-sampling elements, and dispersive instruments for multiplexers.

Advances in computing power are the result of increased speed of semiconductor devices. This has been achieved by continually reducing the transistor linewidths, i.e., the dimensions of transistors. However, as the scale of semiconductor devices decreases, control of the complete profile of the features, rather than the linewidth alone, is crucial for effective chip operation. When the sidewalls are perfectly vertical, knowledge of linewidth (and height) is enough to reconstruct the entire line, i.e., two parameters define the structure. However, due to limits in current fabrication technologies, vertical sidewalls are difficult, if not impossible, to achieve, and sloping sidewalls are common. In addition to the slope of a sidewall, other features that are artifacts of the technology which may be present in lines include T-topping (the formation of a "T" shaped profile) and footing (the formation of an inverse "T" shaped profile). Capturing such details about the profile is important in achieving a better understanding the fabrication technologies. In addition to measuring such features, controlling them is also important in this highly competitive marketplace. There are thus increasing efforts to develop and refine run-to-run and real-time fabrication control schemes that attempt to make profile measurements in-line or in-situ, and use this information to reduce process variability.

The use of reflectance metrology for the measurement of the thickness of films is well-known. In reflectance metrology, an unpolarized or polarized beam of broadband light is directed towards a sample, and the reflected light is collected. The reflectance can either be measured as absolute value, or relative value when normalized to some reflectance standards. The reflectance signal is then analyzed to determine the thicknesses and optical constants of the film or films. There are numerous examples of reflectance metrology. For example, U.S. Pat. No. 5,835,225 given to Thakur et.al. teaches the use of reflectance metrology to monitor the thickness and refractive indices of a film.

The use of ellipsometry for the measurement of the thickness of films is also well-known (see, for instance, R. M. A. Azzam and N. M. Bashara, "Ellipsometry and Polarized Light", North Holland, 1987). When ordinary, i.e., non-polarized, white light is sent through a polarizer, it emerges as linearly polarized light with its electric field vector aligned with an axis of the polarizer. Linearly polarized light can be defined by two vectors, i.e., the vectors parallel and perpendicular to the plane of incidence. Ellipsometry is based on the change in polarization that occurs when a beam of polarized light is reflected from a medium. The change in polarization consists of two parts: a phase change and an amplitude change. The change in polarization is different for the portion of the incident radiation with the electric vector oscillating in the plane of incidence, and the portion of the incident radiation with the electric vector oscillating perpendicular to the plane of incidence. Ellipsometry measures the results of these two changes which are conveniently represented by an angle $\Delta$, which is the change in phase of the reflected beam $\rho$ from the incident beam; and an angle $\Psi$, which is defined as the arctangent of the amplitude ratio of the incident and reflected beam, i.e., $$\rho = \frac{r_p}{r_s} = \tan(\Psi)e^{j(\Delta)},$$

where $r_p$ is the p-component of the reflectance, and $r_s$ is the s-component of the reflectance. The angle of incidence and reflection are equal, but opposite in sign, to each other and may be chosen for convenience. Since the reflected beam is fixed in position relative to the incident beam, ellipsometry is an attractive technique for in-situ control of processes which take place in a chamber.

There are numerous examples of the use of spectroscopic ellipsometry. For example, U.S. Pat. No. 5,131,752 by Yu et.al. teaches the use of ellipsometry to monitor the thickness of a film as it is deposited on a workpiece. The method is however limited to planar surfaces. U.S. Pat. No. 5,739,909 by Blayo et.al. teaches a method for using spectroscopic ellipsometry to measure linewidths by directing an incident beam 131 of polarized light at a periodic structure 100, which has a pitch comprising a feature 121 and a space, as is depicted in FIG. 1. A diffracted beam 132, which leaves the periodic structure at an angle $\theta$ which is equal, but opposite in sign, to the angle $\theta$ the incident beam makes with the periodic structure, is detected and its intensity and polarization are determined at one or more wavelengths. This is then compared with either pre-computed libraries of signals or to experimental data, to extract linewidth information. While this is a non-destructive test, it does not provide profile information, but yields only a single number to characterize the quality of the process. Another method for characterizing features of a patterned material is disclosed in U.S. Pat. No. 5,607,800 by D. H. Ziger. According to this method, the intensity, but not the phase, of zeroth-order diffraction is monitored for a number of wavelengths, and correlated with features of the patterned material.

While numerous non-destructive techniques have been suggested for linewidth measurements, such as the scanning electron microscope (SEM) and optical microscope, none of them have the ability to provide complete profile information. There exist cross-sectional profile metrology tools, such as the atomic force microscope (AFM) and the transmission electron microscope, that provide profile information, but at the cost of being either prohibitively slow or destructive. Further disadvantages include that these techniques cannot be implemented in-line or in-situ. Finally, there exists scatterometry techniques, such as U.S. Pat. No. 5,867,276 by McNeil et.al. which teaches a method for measuring profile information. This is accomplished by directing multiple wavelength, polarized light onto a periodic structure at a single angle of incidence, and collecting the diffracted intensity signal. It is important to note that the incident beam is of a single planar polarization. This diffracted signal is then compared to a pre-compiled library of signals to extract profiles of features. The library is either pre-computed based on theoretical calculations or is based purely on experimental signals. This method uses only the intensity of the optical signal and has been shown to suffer from non-uniqueness, i.e., there exist scenarios where two completely different profiles yield the same intensity signal, even across a broad range of wavelengths (see, for example, S. Bushman, S. Farrer, "Scatterometry Measurements for Process Monitoring of Gate Etch", AEC/APC Workshop IX, Sematech, Sep. 20–24 1997). This non-uniqueness reduces robustness and accuracy of the results.

The ability to determine the diffraction characteristics of periodic gratings with high precision is useful for the refinement of existing applications. Furthermore, the accurate determination of the diffraction characteristics of periodic gratings is useful in extending the applications to which diffraction gratings may be applied. However, it is well known that modeling of the diffraction of electromagnetic radiation from periodic structures is a complex problem that requires sophisticated techniques. Closed analytic solutions are restricted to geometries which are so simple that they are of little interest, and current numerical techniques generally require a prohibitive amount of computation time.

The general problem of the mathematical analysis of electromagnetic diffraction from periodic gratings has been addressed using a variety of different types of analysis, and several rigorous theories have been developed in the past decades. Methods using integral formulations of Maxwell's equations were used to obtain numerical results by A. R. Neureuther and K. Zaki ("Numerical methods for the analysis of scattering from nonplanar periodic structures," *Intn'l URSI Symposium on Electromagnetic Waves*, Stresa, Italy, 282–285, 1969) and D. Maystre ("A new general integral theory for dielectric coated gratings," *J. Opt. Soc. Am.*, vol. 68, no. 4, 490–495, April 1978). Methods using differential formulations of Maxwell's equations have also been developed by a number of different groups. For instance, an iterative differential formulation has been developed by M. Neviere, P. Vincent, R. Petit and M. Cadilhac ("Systematic study of resonances of holographic thin film couplers," *Optics Communications*, vol. 9, no. 1, 48–53, September 1973), and the rigorous coupled-wave analysis method has been developed by M. G. Moharam and T. K. Gaylord ("Rigorous Coupled-Wave Analysis of Planar-Grating Diffraction," *J. Opt. Soc. Am.*, vol. 71, 811–818, July 1981). Further work in RCWA formulations has been done by E. B. Grann and D. A. Pommet ("Formulation for Stable and Efficient Implementation of the Rigorous Coupled-Wave Analysis of Binary Gratings," *J. Opt. Soc. Am. A*, vol. 12, 1068–1076, May 1995), and E. B. Grann and D. A. Pommet ("Stable Implementation of the Rigorous Coupled-Wave Analysis for Surface-Relief Dielectric Gratings: Enhanced Transmittance Matrix Approach", *J. Opt. Soc. Am. A*, vol. 12, 1077–1086, May 1995).

Conceptually, an RCWA computation consists of four steps:
  The grating is divided into a number of thin, planar layers, and the section of the ridge within each layer is approximated by a rectangular slab.
  Within the grating, Fourier expansions of the electric field, magnetic field, and permittivity leads to a system of differential equations for each layer and each harmonic order.
  Boundary conditions are applied for the electric and magnetic fields at the layer boundaries to provide a system of equations.
  Solution of the system of equations provides the diffracted reflectivity from the grating for each harmonic order.

The accuracy of the computation and the time required for the computation depend on the number of layers into which the grating is divided and the number of orders used in the Fourier expansion.

A number of variations of the mathematical formulation of RCWA have been proposed. For instance, variations of RCWA proposed by P. Lalanne and G. M. Morris ("Highly Improved Convergence of the Coupled-Wave Method for TM Polarization," *J. Opt. Soc. Am. A*, 779–784, 1996), L. Li and C. Haggans ("Convergence of the coupled-wave method for metallic lamellar diffraction gratings", *J. Opt. Soc. Am. A*, 1184–1189, June, 1993), and G. Granet and B. Guizal ("Efficient Implementation of the Coupled-Wave Method for Metallic Lamellar Gratings in TM Polarization", *J. Opt. Soc. Am. A*, 1019–1023, May, 1996) differ as whether the Fourier expansions are taken of the permittivity or the reciprocal of the permittivity. (According to the lexography of the present specification, all of these variations are considered to be "RCWA.") For a specific grating structure, there can be substantial differences in the numerical convergence of the different formulations due to differences in the singularity of the matrices involved in the calculations, particularly for TM-polarized and conically-polarized incident radiation. Therefore, for computational efficiency it is best to select amongst the different formulations.

Frequently, the profiles of a large number of periodic gratings must be determined. For instance, in determining the ridge profile which produced a measured diffraction spectrum in a scatterometry application, thousands or even millions of profiles must be generated, the diffraction spectra of the profiles are calculated, and the calculated diffraction spectra are compared with the measured diffraction spectrum to find the calculated diffraction spectrum which most closely matches the measured diffraction spectrum. Further examples of scatterometry applications which require the analysis of large numbers of periodic gratings include U.S. Pat. Nos. 5,164,790, 5,867,276 and 5,963,329, and "Specular Spectroscopic Scatterometry in DUV lithography," X. Niu, N. Jakatdar, J. Bao and C. J. Spanos, SPIE, vol. 3677, pp. 159–168, from thousands to millions of diffraction profiles must be analyzed. However, using an accurate method such as RCWA, the computation time can be prohibitively long. Thus, there is a need for methods and apparatus for rapid and accurate analysis of diffraction data to determine the profiles of periodic gratings.

Additional objects and advantages of the present application will become apparent upon review of the Figures, Detailed Description of the Present Invention, and appended claims.

SUMMARY OF THE INVENTION

The present invention is directed to a method for reducing the computation time of rigorous coupled-wave analyses (RCWA) of the diffraction of electromagnetic radiation from a periodic grating. RCWA calculations involve the division of the periodic grating into layers, with the initial layer being the atmospheric space above the grating, the last layer being the substrate below the grating, and the periodic features of the grating lying in intermediate layers between the atmospheric space and the substrate. A cross-section of the periodic features is discretized into a plurality of stacked rectangular sections, and within each layer the permittivity, and the electric and magnetic fields of the radiation are formulated as a sum of harmonic components along the direction of periodicity of the grating.

Application of Maxwell's equations provides an intra-layer matrix equation in each of the intermediate layers l of the form $$\left[\frac{\partial^2 S_{l,y}}{\partial z'^2}\right] = [A_l][S_{l,y}]$$

where $S_{l,y}$ are harmonic amplitudes of an electromagnetic field, z is the perpendicular to the periodic grating, and the wave-vector matrix $A_l$ is only dependent on intra-layer parameters and incident-radiation parameters. A homogeneous solution of the intra-layer matrix equation involves an expansion of the harmonic amplitudes $S_{l,y}$ into exponential functions dependent on eigenvectors and eigenvalues of said wave-vector matrix $A_l$.

According to the present invention, a layer-property parameter region, an incident-radiation parameter region, a layer-property parameter-region sampling, and an incident-radiation parameter-region sampling are determined. Also, a maximum harmonic order to which the electromagnetic fields are to be computed is determined. The required permittivity harmonics are calculated for each layer-property value, as determined by the layer-property parameter-region sampling of the layer-property parameter region. The wave-vector matrix A and its eigenvectors and eigenvalues are calculated for each layer-property value and each incident-radiation value, as determined by the incident-radiation parameter-region sampling of the incident-radiation parameter region. The calculated eigenvectors and eigenvalues are stored in a memory for use in analysis of the diffraction of incident electromagnetic radiation from the periodic grating.

DETAILED DESCRIPTION OF THE PREFERRED EMBODIMENT

Figure 1:
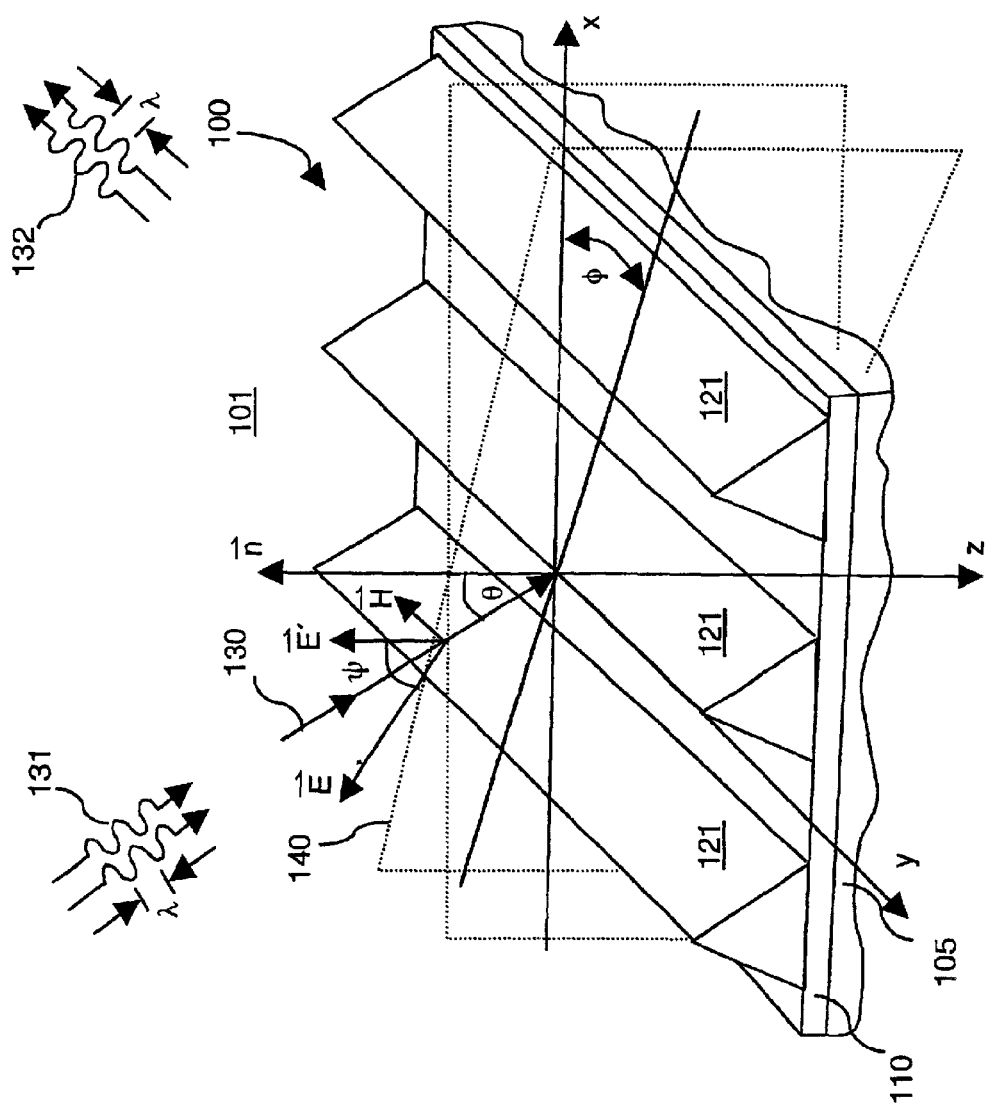
FIG. 1 shows a section of a diffraction grating labeled with variables used in the mathematical analysis of the present invention.

The method and apparatus of the present invention dramatically improves the performance and efficiency for metrology of profiles of one-dimensionally or two-dimensionally repeating, regularly-spaced series of structures, by reducing the computation time required for RCWA computations by pre-processing and caching intra-layer information and incident-radiation information, and using the cached intra-layer and incident-radiation information for RCWA calculations.

Section 1 of the present Detailed Description describes apparatus and methods for the acquisition of diffraction data from one-dimensionally and two-dimensionally repeating, regularly-spaced series of structures using optical metrology.

Section 2 of the present Detailed Description describes the mathematical formalism for RCWA calculations for the diffraction of TE-polarized incident radiation from a periodic grating. Definitions of the variables used in the present specification are provided, and intra-layer Fourier-space versions of Maxwell's equations are presented and solved, producing z-dependent electromagnetic-field harmonic amplitudes, where z is the direction normal to the grating. Formulating the electromagnetic-field harmonic amplitudes in each layer as exponential expansions produces an eigenequation for a wave-vector matrix dependent only on intra-layer parameters and incident-radiation parameters. Coefficients and exponents of the exponential harmonic amplitude expansions are functions of the eigenvalues and eigenvectors of the wave-vector matrices. Application of inter-layer boundary conditions produces a boundary-matched system matrix equation, and the solution of the boundary-matched system matrix equation provides the remaining coefficients of the harmonic amplitude expansions.

Section 3 of the present Detailed Description describes mathematical formalisms for RCWA calculations of the diffracted reflectivity of TM-polarized incident radiation which parallels the exposition of Section 1.

Section 4 of the present Detailed Description presents a preferred method for the solution of the boundary-matched system matrix equation.

Section 5 of the present Detailed Description describes the method and apparatus of the present invention. Briefly, the pre-calculation/caching portion of the method of the present invention involves:

selection of an intra-layer parameter region, an intra-layer parameter sampling, an incident-radiation parameter region, and an incident-radiation parameter sampling;

generation of wave-vector matrices for intra-layer parameters spanning the intra-layer parameter region, as determined by the intra-layer parameter sampling, and incident-radiation parameters spanning the incident-radiation parameter region, as determined by the incident-radiation parameter sampling;

solution for the eigenvectors and eigenvalues of the wave-vector matrices in the investigative region; and caching of the eigenvectors and eigenvalues of the wave-vector matrices.

Briefly, the portion of the method of the present invention for the use of the cached computations to calculate the diffracted reflectivity produced by a periodic grating includes the steps of:

discretization of the profile of a ridge of the periodic grating into layers of rectangular slabs;

retrieval from cache of the eigenvectors and eigenvalues for the wave-vector matrix corresponding to each layer of the profile;

compilation of the retrieved eigenvectors and eigenvalues for each layer to produce a boundary-matched system matrix equation; and solution of the boundary-matched system matrix equation to provide the diffracted reflectivity.

Section 6 of the present Detailed Description describes the matching methodology used in comparing a measured diffraction spectrum to entries in a library of profile-spectra pairs, in order to determine the profile corresponding to the measured diffraction spectrum.

Figure 9:
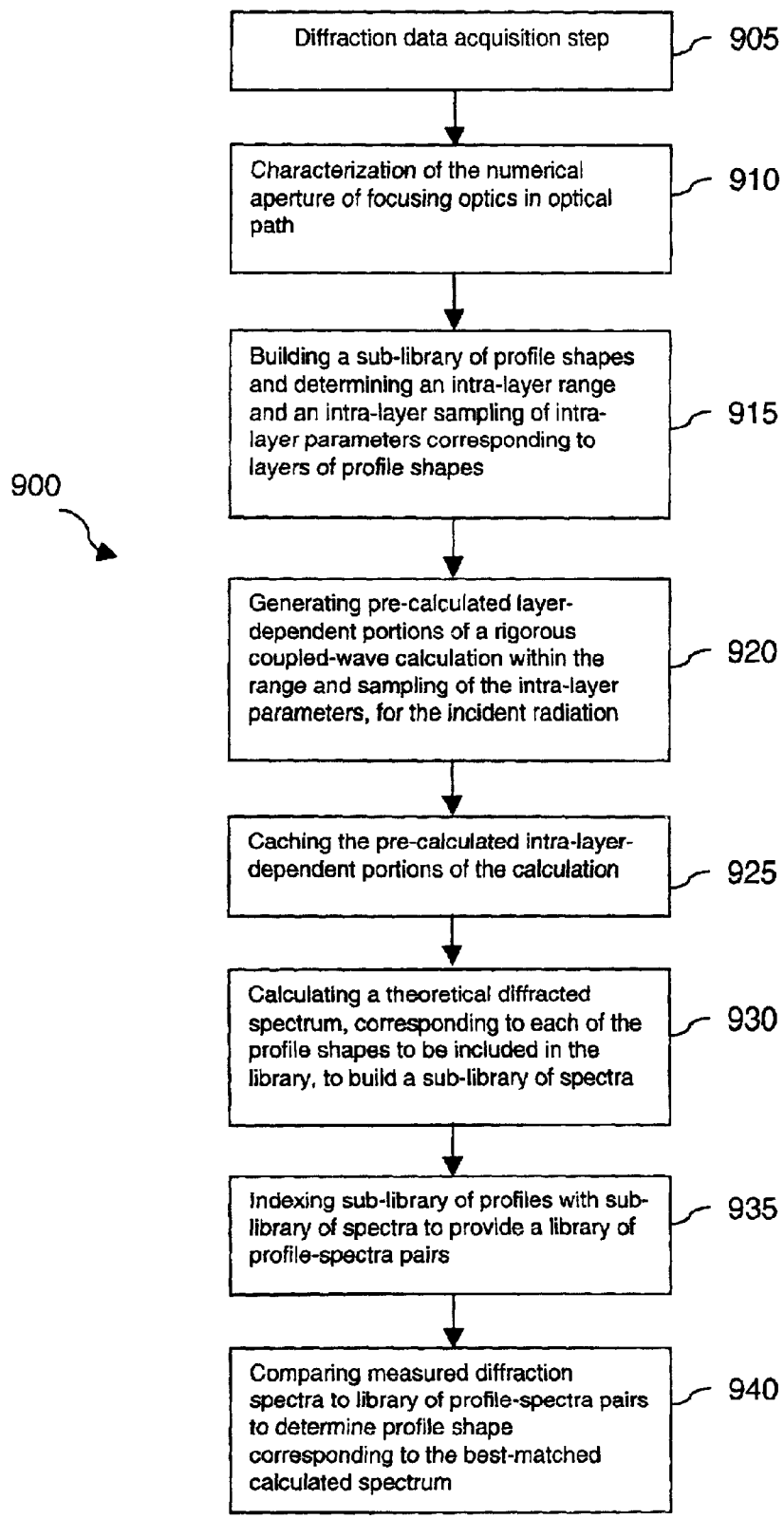
FIG. 9 is a flowchart depicted the sequence of events for the implementation of the method of the present invention.

A flowchart for the complete sequence of events for the present invention is shown in FIG. 9. First, diffraction signals are acquired 905 by an optical setup, using either a reflectometry or an ellipsometry configuration, as described below and depicted in FIGS. 10 and 11. Then, numerical aperture of the focusing optics in the optical path of the reflectometry or ellipsometry configuration are characterized 910, in order to determine the range of incidence angles that need to be taken into account in the calculation of the simulated diffraction spectra. Next, a sub-library of profile shapes is constructed 915 based on a range and a sampling of intra-layer parameters characterizing the profiles. Intra-layer dependent portions of the rigorous coupled-wave calculation are then pre-computed 920 for the selected range and sampling of intra-layer parameters, and cached 925 in a memory. Then, using the pre-computed and cached intra-layer dependent portions of the rigorous coupled-wave calculation, diffraction spectra are calculated 930 for each profile in the sub-library, to produce a sub-library of spectra. The sub-library of profiles is then indexed 935 with the sub-library of spectra to provide a library of profile-spectra pairs. Finally, a measured diffraction spectrum obtained from a physical profile is compared 940 to the spectra in the library, in order to determine the best-matched calculated spectrum. The profile corresponding to the best-matched calculated spectrum is the calculated estimate of the physical profile.

1. Acquisition of Diffraction Data

Figure 8:
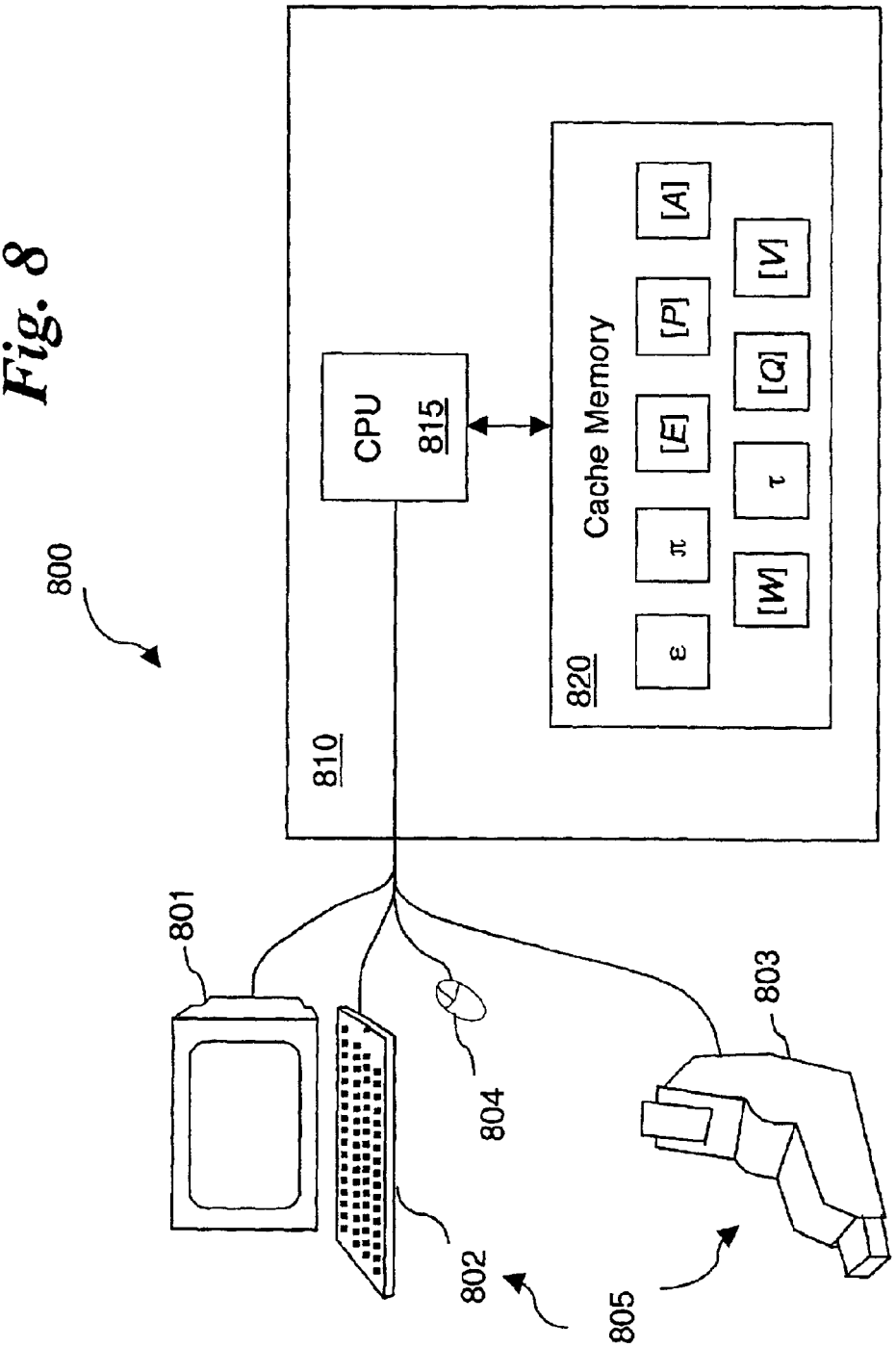
FIG. 8 shows a computation system for implementation of the computation portion of present invention.
Figure 10:
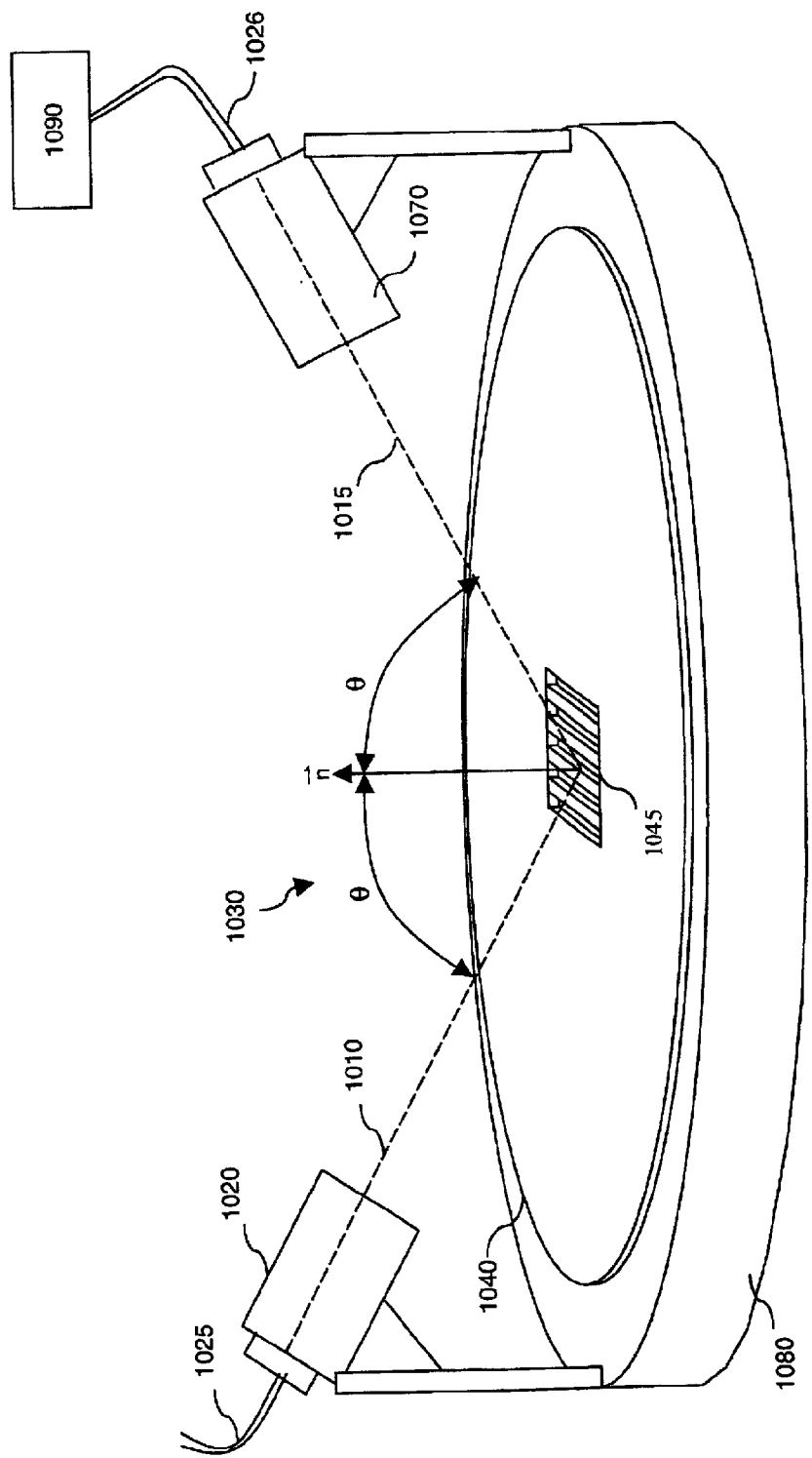
FIG. 10 shows an apparatus for producing radiation incident on a periodic grating and monitoring the radiation diffracted from the periodic grating.

As shown in FIG. 10, the incident beam (1010) is generated by an excitation head (1020) of an ellipsometer (1030). The incident beam (1010) consists of radiation having two polarizations to allow measurement of both intensity and phase of the diffracted electromagnetic radiation (1011) monitored by an optical detector (1070). An optical fiber (1025) transports white light from a source (not shown) to the excitation head (1020). The white light could either be polarized light or unpolarized light. The incident beam (1010) is directed onto a sample (1045) mounted on a workpiece (1040) such that the angle of incidence θ measured from the normal $\bar{n}$ of the sample (1045) is between 20 and 90 degrees, more preferrably between 30 and 80 degrees, still more preferrably between 40 and 75 degrees, still more preferrably between 50 and 70 degrees. The reason the range from 50 and 70 degrees is preferred is because angles in that range have been found to generally be most sensitive for the metrology of grating materials typically found in semiconductor processing. Most preferrably, the angle of incidence θ is near the Brewster's angle, i.e., the angle such that the sum of the incident and reflected angles is 90 degrees. When the radiation (1010) is incident at the Brewster's angle, the diffracted radiation (1011) consists of only a single polarization. The workpiece (1040) can be placed on either a chill plate, a hot plate or the developer module (these modules will henceforth be referred collectively as the process plate and assigned the reference numeral (1080)) on the wafer track, or in the end chamber of an etcher, or in an end-station or metrology station in a chemical mechanical polishing tool. The reflected beam (1011) leaves the workpiece (1040) at an angle θ which is equal to the angle of incidence θ, but on the opposite side of the normal $\bar{n}$. In the case that the apparatus (1030) of FIG. 10 is a spectrometer, then the diffracted radiation (1015) is received by the detector (1070) which separates the spectra into two polarizations before passing the signal to a spectrometer (1090) via an optical fiber (1027). In the case that the apparatus (1030) of FIG. 10 is a reflectometer, the diffracted radiation (1015) is sent directly to the spectrometer (1090) via the optical fiber (1026). The spectrometer (1090) then sends the signal to either a charge coupled device (not shown) or a photomultiplier (not shown) which converts the optical signal to an electrical signal which enters a signal processor, such as the analysis processor of the present invention depicted in FIG. 8 and described in detail below. In the case that the apparatus (1030) of FIG. 10 is an ellipsometer, angles Δ and Ψ are determined from the numerical signal processing system of FIG. 8. As discussed above, the magnitude of the diffracted radiation (1071) provides Ψ, and the relative phase of the two polarizations provides Δ. In the case that the apparatus (1030) of FIG. 10 is a reflectometer, the relative intensity is measured.

According to another preferred embodiment of the present invention for a diffraction data acquisition system, the broadband ellipsometry or reflectometry apparatus (1030) of FIG. 10 is modified to include focusing optics to reduce the spot size to less than the size of the test area. Typically, such focusing optics produce illumination regions of 50 μm×50 μm, or smaller, and utilize a pattern recognition module to center the spot in the test area.

Figure 11:
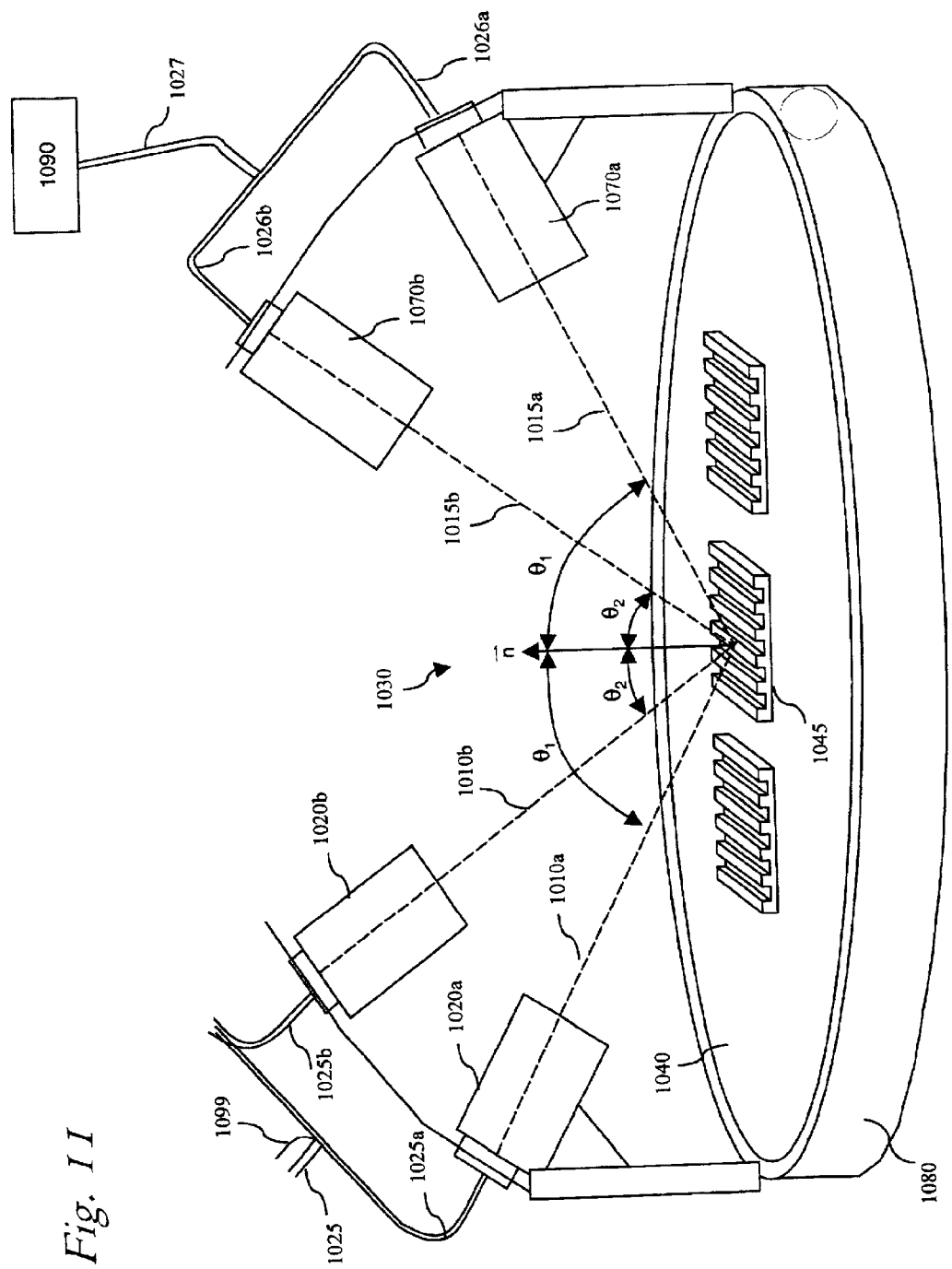
FIG. 11 shows an apparatus for producing radiation incident on a periodic grating and monitoring the radiation diffracted from the periodic grating at two angles of incidence and diffraction.

According to the present invention, a diffraction data acquisition system may utilize multiple detectors and multiple excitation heads. For instance, as shown in FIG. 11, the system (1030') may utilize two excitation heads (1020a) and (1020b), and two detectors (1070a) and (1070b). Two broadband incident beams (1110a) and (1110b) are generated by excitation heads (1120a) and (1120b), with each incident beam (1110a) and (1110b) including two polarizations of the electromagnetic wave to allow for both intensity and phase measurements. As with the single excitation head (1020) apparatus (1030) of FIG. 10, an optical fiber (1025) transports broadband radiation from a source (not shown) to the two excitation heads (1120a) and (1120b). A switching mechanism (1099) directs the broadband radiation alternately to the two optic fiber branches (1025a) and (1025b) which lead to the two excitation heads (1020a) and (1020b), respectively. In the preferred embodiment, the switching mechanism (1099) is a wheel with an opening in one semicircle, so that rotation of the switching wheel (1099) by 180 degrees produces a switching of the optic fiber branch (1025a) or (1025b) to which the radiation is directed. According to the preferred embodiment of the present invention, the incident beams are directed to workpiece (1140) so that the angles of incidence $\theta_1$ and $\theta_2$ are approximately 50 and 70 degrees. Other angles of incidence are also contemplated as useful, depending on the workpiece, and angles between zero and 90 degrees are possible. Since ellipsometric measurements are made for two angles of incidence $\theta_1$ and $\theta_2$, the angles $\theta_1$ and $\theta_2$ are chosen to be disparate enough that redundancy of information is not an issue, while both $\theta_1$ and $\theta_2$ are chosen to be close enough to Brewster's angle that the incident beam is sensitive to the grating features. The diffracted beams (1015a) and (1015b) leave the workpiece at angles $\theta_1$ and $\theta_2$, which are equal to the angles of incidence $\theta_1$ and $\theta_2$, but to the opposite side of the normal $\overline{n}$. The diffracted beams (1015a) and (1015b) are received by detectors (1070a) and (1070b). In the case that the apparatus (1030') of FIG. 11 is a spectrometer, the diffracted radiation (1015a) and (1015b) is received by detectors (1070a) and (1070b) which each separates the diffracted radiation (1015a) and (1015b) into two polarizations before passing the signal to a spectrometer (1090) via an optical fiber (1027). In the case that the apparatus (1030) of FIG. 10 is a reflectometer, then the diffracted radiation (1011) is sent directly to the spectrometer (1090) via an optical fiber (1027). The spectrometer (1090) sends the signal to either a charge coupled device (not shown) or a photomultiplier (not shown) which converts the optical signal to an electrical signal which enters a signal processor, such as the analysis processor of the present invention depicted in FIG. 8 and described in detail below. In the case that the apparatus (1030') of FIG. 11 is an ellipsometer, angles $\Delta$ and $\Psi$ as a function of frequency are determined from the numerical signal processing system of FIG. 8. In the case that the apparatus (1030') of FIG. 11 is a reflectometer, the relative intensity is measured. It should be understood that multiple detectors (1070a) and (1070b) are not necessary to perform multiple-angle reflectometry or ellipsometry measurements since the excitation head (1020) and detector (1070) may perform a first measurement for an angle of incidence of $\theta_1$, and then be moved to perform a second measurement for an angle of incidence of $\theta_2$. Furthermore, a focusing lenses may be included in the optical path of the apparatuses of FIGS. 10 or 11 to produce an area of incidence which small enough to meet test-area restrictions.

2. Rigorous Coupled-Wave Analysis for TE-Polarized Incident Radiation

A section of a periodic grating (100) is shown in FIG. 1. The section of the grating (100) which is depicted includes three ridges (121) which are shown as having a triangular cross-section. It should be noted that the method of the present invention is applicable to cases where the ridges have shapes which are considerably more complex, and even to cases where the categories of "ridges" and "troughs" may be ill-defined. According to the lexography of the present specification, the term "ridge" will be used for one period of a periodic structure on a substrate. Each ridge (121) of FIG. 1 is considered to extend infinitely in the +y and −y directions, and an infinite, regularly-spaced series of such ridges (121) are considered to extend in the +x and −x directions. The ridges (121) are atop a deposited film (110), and the film (110) is atop a substrate (105) which is considered to extend semi-infinitely in the +z direction. The normal vector $\overline{n}$ to the grating is in the −z direction.

FIG. 1 illustrates the variables associated with a mathematical analysis of a diffraction grating according to the present invention. In particular:

$\theta$ is the angle between the Poynting vector (130) of the incident electromagnetic radiation (131) and the normal vector $\overline{n}$ of the grating (100). The Poynting vector (130) and the normal vector $\overline{n}$ define the plane of incidence (140).

$\phi$ is the azimuthal angle of the incident electromagnetic radiation (131), i.e., the angle between the direction of periodicity of the grating, which in FIG. 1 is along the x axis, and the plane of incidence (140). (For ease of presentation, in the mathematical analysis of the present specification the azimuthal angle $\phi$ is set to zero.)

$\Psi$ is the angle between the electric-field vector $\overline{E}$ of the incident electromagnetic radiation (131) and the plane of incidence (140), i.e., between the electric field vector $\overline{E}$ and its projection $\overline{E}'$ on the plane of incidence (140). When $\phi=0$ and the incident electromagnetic radiation (131) is polarized so that $\Psi=\pi/2$, the electric-field vector $\overline{E}$ is perpendicular to the plane of incidence (140) and the magnetic-field vector $\overline{H}$ lies in the plane of incidence (140), and this is referred to as the TE polarization. When $\phi=0$ and the incident electromagnetic radiation (131) is polarized so that $\Psi=0$, the magnetic-field vector $\overline{H}$ is perpendicular to the plane of incidence (140) and the electric-field vector $\overline{E}$ lies in the plane of incidence (140), and this is referred to as the TM polarization. Any planar polarization is a combination of in-phase TE and TM polarizations. The method of the present invention described below can be applied to any polarization which is a superposition of TE and TM polarizations by computing the diffraction of the TE and TM components separately and summing them. Furthermore, although the 'off-axis' $\phi \neq 0$ case is more complex because it cannot be separated into TE and TM components, the present invention is applicable to off-axis incidence radiation as well.

$\lambda$ is the wavelength of the incident electromagnetic radiation (131).

Figure 2:
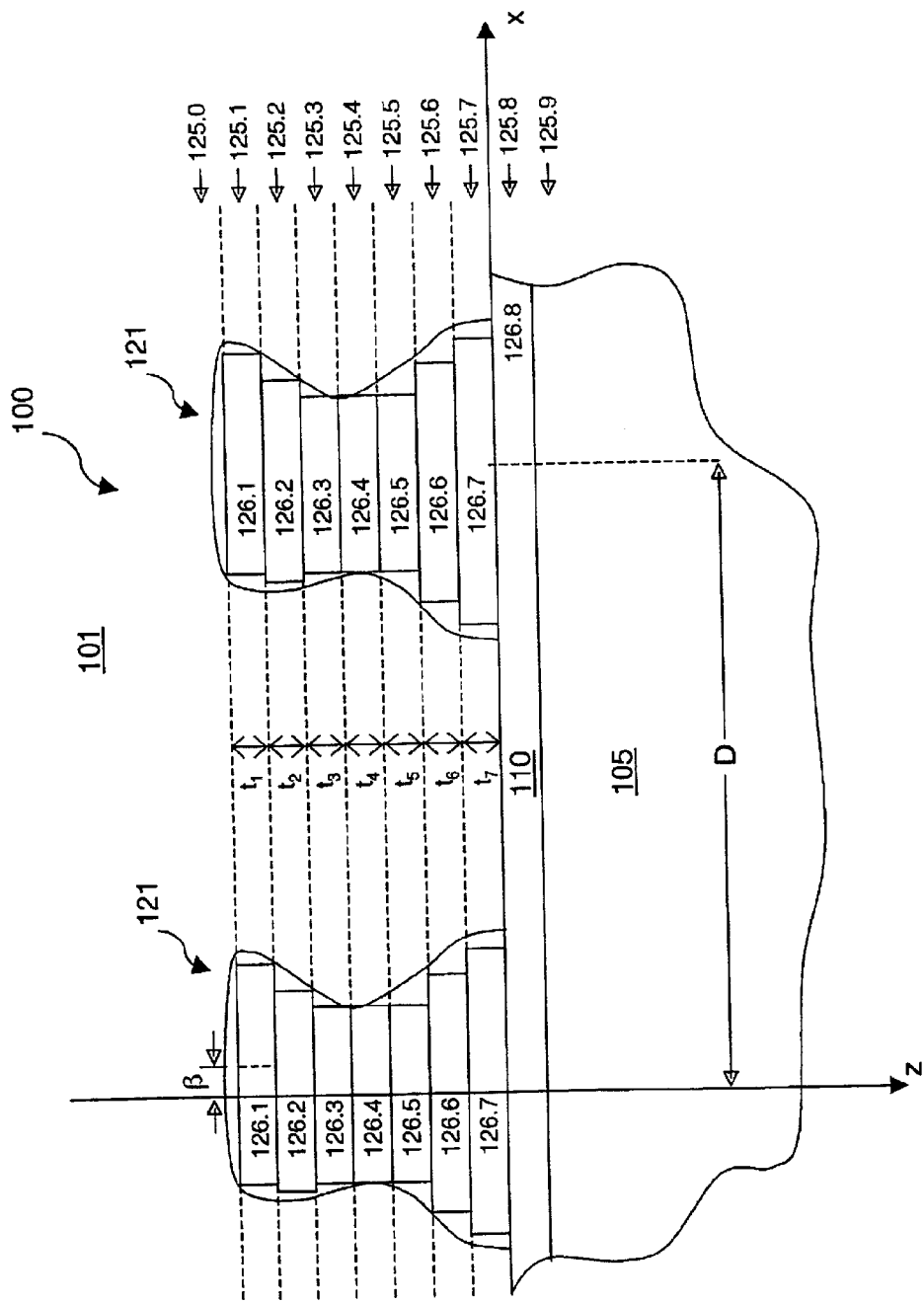
FIG. 2 shows a cross-sectional view of a pair of ridges labeled with dimensional variables used in the mathematical analysis of the present invention.

FIG. 2 shows a cross-sectional view of two ridges (121) of an exemplary periodic grating (100) (which will be labeled using the same reference numerals as the grating of FIG. 1.), illustrating the variables associated with a mathematical description of the dimensions of the diffraction grating (100) according to the present invention. In particular:

L is the number of the layers into which the system is divided. Layers 0 and L are considered to be semi-infinite layers. Layer 0 is an "atmospheric" layer (101), such as vacuum or air, which typically has a refractive index $n_0$ of unity. Layer L is a "substrate" layer (105), which is typically silicon or germanium in semiconductor applications. In the case of the exemplary grating 100 of FIG. 2, the grating (100) has ten layers with the atmospheric layer (101) being the zeroeth layer (125.0), the ridges (121) being in the first through seventh layers (125.1) through (125.7), the thin film (110) being the eighth layer (125.8), and the substrate (105) being the ninth layer (125.9). (For the mathematical analysis described below, the thin-film (110) is considered as a periodic portion of the ridge (121) with a width d equal to the pitch D.) The portion of ridge (121) within each intermediate layer (125.1) through (125.(L−1)) is approximated by a thin planar slab (126) having a rectangular cross-section. (Generically or collectively, the layers are assigned reference numeral (125), and, depending on context, "layers (125)" may be considered to include the atmospheric layer (101) and/or the substrate (105).) In general, any geometry of ridges (121) with a cross-section which does not consist solely of vertical and horizontal sections can be better approximated using a large number of layers (125).

D is the periodicity length or pitch, i.e., the length between equivalent points on pairs of adjacent ridges (121).

$d_l$ is the width of the rectangular ridge slab (126.l) in the lth layer (125.l).

$t_l$ is the thickness of the rectangular ridge slab (126.l) in the lth layer (125.l) for 1<l<(L−1). The thicknesses $t_l$ of the layers (125) are chosen such that every vertical line segment within a layer (125) passes through only a single material. For instance, if in FIG. 2 the materials in layers (125.4), (125.5), and (125.6) are the same, but different than the materials in layers (125.3) and (125.7), than it would be acceptable to combine layers (125.4) and (125.5), or layers (125.5) and (125.6), or layers (125.4), (125.5) and (125.6) into a single layer. However, it would not be acceptable to combine layers (125.3) and (125.4), or layers (125.6) and (125.7) into a single layer.

$n_l$ is the index of refraction of the material in the rectangular ridge slab (126) of the lth layer (125.l).

In determining the diffraction generated by grating (100), a Fourier space version of Maxwell's equations is used. As shown in the calculation process flow diagram of FIG. 3, the permittivities $\epsilon_l(x)$ for each layer l are determined or acquired (310) (for instance, according to the method described in provisional patent application Ser. No. 60/178,540, filed Jan. 26, 2000, entitled Profiler Business Model, by the present inventors, and provisional patent application Ser. No. 60/209,424, filed Jun. 2, 2000, entitled Profiler Business Model, by the present inventors, both of which are incorporated herein by reference), and a one-dimensional Fourier transformation of the permittivity $\epsilon_l(x)$ of each layer l is performed (312) along the direction of periodicity, $\hat{x}$, of the periodic grating (100) to provide the harmonic components of the permittivity $\epsilon_{l,i}$, where i is the order of the harmonic component. (In FIGS. 3, 4, 5 and 6, process steps are shown enclosed within ovals or rectangles with rounded corners, and the results of calculations are shown enclosed within rectangles with sharp corners. When appropriate in FIG. 3, equation numbers are used in lieu of, or in addition to, reference numerals.) In particular, the real-space permittivity $\epsilon_l(x)$ of the lth layer is related to the permittivity harmonics $\epsilon_{l,i}$ of the lth layer by $$\epsilon_l(x) = \sum_{i=-\infty}^{\infty} \epsilon_{l,i} \exp\left(j\frac{2\pi i}{D}x\right). \tag{1.1.1}$$

Therefore, via the inverse transform, $$\epsilon_{l,0} = n_r^2 \frac{d}{D} + n_0^2 \left(1 - \frac{d_l}{D}\right), \tag{1.1.2}$$

and for i not equal to zero, $$\epsilon_{l,i} = (n_r^2 - n_0^2) \frac{\sin\left(\pi i \frac{d_l}{D}\right)}{\pi i} e^{-j\pi\beta/D}, \tag{1.1.3}$$

where $n_r$ is the index of refraction of the material in the ridges (121) in layer l, the index of refraction $n_0$ of the atmospheric layer (101) is typically near unity, and β is the x-offset of the center of the central rectangular ridge slab (126.l) (i.e., the ridge (121) nearest x=0, where generally it is attempted to position the x=0 point at the center of a ridge (121)) from the origin. The present specification explicitly addresses periodic gratings where a single ridge material and a single atmospheric material are found along any line in the x-direction. However, as per disclosure document serial number 474051, filed May 15, 2000, entitled Optical Profilometry for Sub-Micron Periodic Features with Three or More Materials in a Layer, by the same inventors, the present invention may be applied to gratings having more than one ridge material along a line in the x-direction.

According to the mathematical formulation of the present invention, it is convenient to define the (2o+1)×(2o+1) Toeplitz-form, permittivity harmonics matrix $E_l$ as $$E_l = \begin{bmatrix} \epsilon_{l,0} & \epsilon_{l,-1} & \epsilon_{l,-2} & \cdots & \epsilon_{l,-2o} \\ \epsilon_{l,1} & \epsilon_{l,0} & \epsilon_{l,-1} & \cdots & \epsilon_{l,-(2o-1)} \\ \epsilon_{l,2} & \epsilon_{l,1} & \epsilon_{l,0} & \cdots & \epsilon_{l,-(2o-2)} \\ \cdots & \cdots & \cdots & \cdots & \cdots \\ \epsilon_{l,2o} & \epsilon_{l,(2o-1)} & \epsilon_{l,(2o-2)} & \cdots & \epsilon_{l,0} \end{bmatrix} \tag{1.1.4}$$

As will be seen below, to perform a TE-polarization calculation where oth-order harmonic components of the electric field $\overline{E}$ and magnetic field $\overline{H}$ are used, it is necessary to use harmonics of the permittivity $\epsilon_{l,i}$ up to order 2o.

For the TE polarization, in the atmospheric layer the electric field $\overline{E}$ is formulated (324) as $$\vec{E}_{0,y} = \exp(-jk_0 n_0 (\sin\theta x + \cos\theta z) + \tag{1.2.1}$$
$$\sum_i R_i \exp(-j(k_{xi}x - k_{0,zi}z)),$$

where the term on the left of the right-hand side of equation (1.2.1) is an incoming plane wave at an angle of incidence θ, the term on the right of the right-hand side of equation (1.2.1) is a sum of reflected plane waves and $R_i$ is the magnitude of the ith component of the reflected wave, and the wave vectors $k_0$ and ($k_{xi}$, $k_{0,zi}$) are given by $$k_0 = \frac{2\pi}{\lambda} \omega(\mu_0 \epsilon_0)^{1/2}, \tag{1.2.2}$$

$$k_{xi} = k_0 \left(n_0 \sin(\theta) - i\left(\frac{\lambda}{D}\right)\right), \tag{1.2.3}$$

and $$k_{0,zi} = \begin{cases} k_0(n_I^2 - (k_{xi}/k_0)^2)^{1/2} \\ -jk_0(n_I^2 - (k_{xi}/k_0)^2)^{1/2} \end{cases} \quad (1.2.4)$$

where the value of $k_{0,zi}$ is chosen from equation (1.2.4), i.e., from the top or the bottom of the expression, to provide $Re(k_{0,zi}) - Im(k_{0,zi}) > 0$. This insures that $k_{0,zi}^2$ has a positive real part, so that energy is conserved. It is easily confirmed that in the atmospheric layer (101), the reflected wave vector ($k_{xi}$, $k_{0,zi}$) has a magnitude equal to that of the incoming wave vector $k_0 n_0$. The magnetic field $\overline{H}$ in the atmospheric layer (101) is generated from the electric field $\overline{E}$ by Maxwell's equation (1.3.1) provided below.

The x-components $k_{xi}$ of the outgoing wave vectors satisfy the Floquet condition (which is also called Bloch's Theorem, see Solid State Physics, N. W. Ashcroft and N. D. Mermin, Saunders College, Philadelphia, 1976, pages 133–134) in each of the layers (125) containing the periodic ridges (121), and therefore, due to the boundary conditions, in the atmospheric layer (101) and the substrate layer (105) as well. That is, for a system having an n-dimensional periodicity given by $$f(\vec{r}) = f\left(\vec{r} + \sum_{i=1}^{n} m_i \vec{d}_i\right), \quad (1.2.5)$$

where $\vec{d}_i$ are the basis vectors of the periodic system, and $m_i$ takes on positive and negative integer values, the Floquet condition requires that the wave vectors $\vec{k}$ satisfy $$\vec{k} = \vec{k}_0 + 2\pi \sum_{i=1}^{n} m_i \vec{b}_i, \quad (1.2.6)$$

where $\vec{b}_i$ are the reciprocal lattice vectors given by $$(\vec{b}_i \cdot \vec{d}_j) = \delta_{ij}, \quad (1.2.7)$$

$\vec{k}_0$ is the wave vector of a free-space solution, and $\delta_{ij}$ is the Kronecker delta function. In the case of the layers (125) of the periodic grating (100) of FIGS. 1 and 2 which have the single reciprocal lattice vector $\vec{b}$ is $\hat{x}/D$, thereby providing the relationship of equation (1.2.3).

It may be noted that the formulation given above for the electric field in the atmospheric layer (101), although it is an expansion in terms of plane waves, is not determined via a Fourier transform of a real-space formulation. Rather, the formulation is produced (324) a priori based on the Floquet condition and the requirements that both the incoming and outgoing radiation have wave vectors of magnitude $n_0 k_0$. Similarly, the plane wave expansion for the electric field in the substrate layer (105) is produced (324) a priori. In the substrate layer (105), the electric field $\overline{E}$ is formulated (324) as a transmitted wave which is a sum of plane waves where the x-components $k_{xi}$ of the wave vectors ($k_{xi}$, $k_{0,zi}$) satisfy the Floquet condition, i.e., $$\vec{E}_{L,y} = \sum_i T_i \exp\left(-j\left(k_{xi}x + k_{L,zi}\left(z - \sum_{l=1}^{L-1} t_l\right)\right)\right), \quad (1.2.8)$$

where $$k_{L,zi} = \begin{cases} k_0(n_L^2 - (k_{xi}/k_0)^2)^{1/2} \\ -jk_0(n_L^2 - (k_{xi}/k_0)^2)^{1/2} \end{cases}, \quad (1.2.9)$$

where the value of $k_{L,zi}$ is chosen from equation (1.2.9), i.e., from the top or the bottom of the expression, to provide $Re(k_{L,zi}) - Im(k_{L,zi}) > 0$, insuring that energy is conserved.

The plane wave expansions for the electric and magnetic fields in the intermediate layers (125.1) through (125.(L−1)) are also produced (334) a priori based on the Floquet condition. The electric field $\overline{E}_{l,y}$ in the lth layer is formulated (334) as a plane wave expansion along the direction of periodicity, $\hat{x}$, i.e., $$\vec{E}_{l,y} = \sum_i S_{l,yi}(z) \exp(-jk_{xi}x), \quad (1.2.10)$$

where $S_{l,yi}(z)$ is the z-dependent electric field harmonic amplitude for the lth layer and the ith harmonic. Similarly, the magnetic field $\overline{H}_{l,y}$ in the lth layer is formulated (334) as a plane wave expansion along the direction of periodicity, $\hat{x}$, i.e., $$\vec{H}_{l,x} = -j\left(\frac{\varepsilon_0}{\mu_0}\right)^{1/2} \sum_i U_{l,xi}(z) \exp(-jk_{xi}x), \quad (1.2.11)$$

where $U_{l,xi}(z)$ is the z-dependent magnetic field harmonic amplitude for the lth layer and the ith harmonic.

According to Maxwell's equations, the electric and magnetic fields within a layer are related by $$\vec{H}_l = \left(\frac{j}{\omega \mu_0}\right) \nabla \times \vec{E}_l, \quad (1.3.1)$$

and $$\vec{E}_l = \left(\frac{-j}{\omega \varepsilon_0 \varepsilon_l(x)}\right) \nabla \times \vec{H}_l. \quad (1.3.2)$$

Applying (342) the first Maxwell's equation (1.3.1) to equations (1.2.10) and (1.2.11) provides a first relationship between the electric and magnetic field harmonic amplitudes $S_l$ and $U_l$ of the lth layer:

$$\frac{\partial S_{l,yi}(z)}{\partial z} = k_0 U_{l,xi}. \quad (1.3.3)$$

Similarly, applying (341) the second Maxwell's equation (1.3.2) to equations (1.2.10) and (1.2.11), and taking advantage of the relationship $$k_{xi} + \frac{2\pi h}{D} = k_{x(i-h)} \quad (1.3.4)$$

which follows from equation (1.2.3), provides a second relationship between the electric and magnetic field harmonic amplitudes $S_l$ and $U_l$ for the lth layer:

$$\frac{\partial U_{l,x,i}}{\partial z} = \left(\frac{k_{x,i}^2}{k_0}\right) S_{l,y,i} - k_0 \sum_p \varepsilon_{(i-p)} S_{l,y,p}. \quad (1.3.5)$$

While equation (1.3.3) only couples harmonic amplitudes of the same order i, equation (1.3.5) couples harmonic amplitudes $S_l$ and $U_l$ between harmonic orders. In equation (1.3.5), permittivity harmonics $\varepsilon_l$ from order $-2o$ to $+2o$ are required to couple harmonic amplitudes $S_l$ and $U_l$ of orders between $-o$ and $+o$.

Combining equations (1.3.3) and (1.3.5) and truncating the calculation to order o in the harmonic amplitude S provides (345) a second-order differential matrix equation having the form of a wave equation, i.e., $$\left[\frac{\partial^2 S_{l,y}}{\partial z'^2}\right] = [A_l][S_{l,y}], \quad (1.3.6)$$

$z' = k_0 z$, the wave-vector matrix $[A_l]$ is defined as $$[A_l] = [K_x]^2 - [E_l], \quad (1.3.7)$$

where $[K_x]$ is a diagonal matrix with the (i,i) element being equal to $(k_{x,i}/k_0)$, the permittivity harmonics matrix $[E_l]$ is defined above in equation (1.1.4), and $[S_{l,y}]$ and $[\delta^2 S_{l,y}/\delta z'^2]$ are column vectors with indices i running from $-o$ to $+o$, i.e., $$[S_{l,y}] = \begin{bmatrix} S_{l,y,(-o)} \\ \vdots \\ S_{l,y,0} \\ \vdots \\ S_{l,y,o} \end{bmatrix}, \quad (1.3.8)$$

By writing (350) the homogeneous solution of equation (1.3.6) as an expansion in pairs of exponentials, i.e., $$S_{l,yi}(z) = \sum_{m=1}^{2o+1} w_{l,i,m}[c1_{l,m}\exp(-k_0 q_{l,m} z) + c2_{l,m}\exp(k_0 q_{l,m}(z - t_l))], \quad (1.3.9)$$

its functional form is maintained upon second-order differentiation by z', thereby taking the form of an eigenequation. Solution (347) of the eigenequation $$[A_l][W_l] = [\tau_l][W_l], \quad (1.3.10)$$

provides (348) a diagonal eigenvalue matrix $[\tau_l]$ formed from the eigenvalues $\tau_{l,m}$ of the wave-vector matrix $[A_l]$, and an eigenvector matrix $[W_l]$ of entries $w_{l,i,m}$, where $w_{l,i,m}$ is the ith entry of the mth eigenvector of $[A_l]$. A diagonal root-eigenvalue matrix $[Q_l]$ is defined to be diagonal entries $q_{l,i}$ which are the positive real portion of the square roots of the eigenvalues $\tau_{l,i}$. The constants c1 and c2 are, as yet, undetermined.

By applying equation (1.3.3) to equation (1.3.9) it is found that $$U_{l,x,i}(z) = \sum_{m=1}^{2o+1} v_{l,i,m}[-c1_{l,m}\exp(-k_0 q_{l,m} z) + c2_{l,m}\exp(k_0 q_{l,m}(z - t_l))] \quad (1.3.11)$$

where $v_{l,i,m} = q_{l,m} w_{l,i,m}$. The matrix $[V_l]$, to be used below, is composed of entries $v_{l,i,m}$.

The constants c1 and c2 in the homogeneous solutions of equations (1.3.9) and (1.3.11) are determined by applying (355) the requirement that the tangential electric and magnetic fields be continuous at the boundary between each pair of adjacent layers (125.l)/(125.(l+1)). At the boundary between the atmospheric layer (101) and the first layer (125.1), continuity of the electric field $E_y$ and the magnetic field $H_x$ requires $$\begin{bmatrix} \delta_{i0} \\ jn_0\cos(\theta)\delta_{i0} \end{bmatrix} + \begin{bmatrix} I \\ -jY_0 \end{bmatrix} R = \begin{bmatrix} W_1 & W_1 X_1 \\ V_1 & -V_1 X_1 \end{bmatrix} \begin{bmatrix} c1_1 \\ c2_1 \end{bmatrix} \quad (1.4.1)$$

where $Y_0$ is a diagonal matrix with entries $(k_{0,z,i}/k_0)$, $X_l$ is a diagonal layer-translation matrix with elements $\exp(-k_0 q_{l,m} t_l)$, R is a vector consisting of entries from $R_{-o}$ to $R_{+o}$ and $c1_l$ and $c2_l$ are vectors consisting of entries from $c1_{l,0}$ and $c1_{l,2o+1}$, and $c2_{l,0}$ and $c2_{l,2o+1}$, respectively. The top half of matrix equation (1.4.1) provides matching of the electric field $E_y$ across the boundary of the atmospheric layer (125.0) and the first layer (125.1), the bottom half of matrix equation (1.4.1) provides matching of the magnetic field $H_x$ across the layer boundary (125.0)/(125.1), the vector on the far left is the contribution from the incoming radiation (131) in the atmospheric layer (101), the second vector on the left is the contribution from the reflected radiation (132) in the atmospheric layer (101), and the portion on the right represents the fields $E_y$ and $H_x$ in the first layer (125.1).

At the boundary between adjacent intermediate layers (125.l) and (125.(l+1), continuity of the electric field $E_y$ and the magnetic field $H_x$ requires $$\begin{bmatrix} W_{l-1} X_{l-1} & W_{l-1} \\ V_{l-1} X_{l-1} & -V_{l-1} \end{bmatrix} \begin{bmatrix} c1_{l-1} \\ c2_{l-1} \end{bmatrix} = \begin{bmatrix} W_l & W_l X_l \\ V_l & -V_l X_l \end{bmatrix} \begin{bmatrix} c1_l \\ c2_l \end{bmatrix}, \quad (1.4.2)$$

where the top and bottom halves of the vector equation provide matching of the electric field $E_y$ and the magnetic field $H_x$, respectively, across the l-1/l layer boundary.

At the boundary between the (L-1)th layer 125.(L-1) and the substrate layer (105), continuity of the electric field $E_y$ and the magnetic field $H_x$ requires $$\begin{bmatrix} W_{L-1} X_{L-1} & W_{L-1} \\ V_{L-1} X_{L-1} & -V_{L-1} \end{bmatrix} \begin{bmatrix} c1_{L-1} \\ c2_{L-1} \end{bmatrix} = \begin{bmatrix} I \\ jY_L \end{bmatrix} T, \quad (1.4.3)$$

where, as above, the top and bottom halves of the vector equation provides matching of the electric field $E_y$ and the magnetic field $H_x$, respectively. In contrast with equation (1.4.1), there is only a single term on the right since there is no incident radiation in the substrate (105).

Matrix equation (1.4.1), matrix equation (1.4.3), and the (L-1) matrix equations (1.4.2) can be combined (360) to provide a boundary-matched system matrix equation $$\begin{bmatrix} -I & W_1 & W_1X_1 & 0 & 0 & \cdots & & & \\ jY_0 & V_1 & -VX & 0 & 0 & \cdots & & & \\ 0 & -W_1X_1 & -W_1 & W_2 & W_2X_2 & 0 & 0 & \cdots & \\ 0 & -V_1X_1 & V_1 & V_2 & -V_2X_2 & 0 & 0 & \cdots & \\ 0 & 0 & \ddots & & \ddots & & & \vdots & \\ 0 & 0 & & & & & & & \\ & & \cdots & -W_{L-1}X_{L-1} & -W_{L-1} & I & & & \\ & & & -V_{L-1}X_{L-1} & V_{L-1} & jY_L & & & \end{bmatrix} \begin{bmatrix} R \\ c1_1 \\ c2_1 \\ \vdots \\ \vdots \\ c1_{L-1} \\ c2_{L-1} \\ 0 \end{bmatrix} = \begin{bmatrix} \delta_{i0} \\ j\delta_{i0}n_0\cos(\theta) \\ 0 \\ \vdots \\ \vdots \\ \vdots \\ 0 \end{bmatrix} \quad (1.4.4)$$

and this boundary-matched system matrix equation (1.4.4) may be solved (365) to provide the reflectivity $R_i$ for each harmonic order i. (Alternatively, the partial-solution approach described in "Stable Implementation of the Rigorous Coupled-Wave Analysis for Surface-Relief Dielectric Gratings: Enhanced Transmittance Matrix Approach", E. B. Grann and D. A. Pommet, *J. Opt. Soc. Am. A*, vol. 12, 1077–1086, May 1995, can be applied to calculate either the diffracted reflectivity R or the diffracted transmittance T.)

3. Rigorous Coupled-Wave Analysis for the TM Polarization

Figure 3:
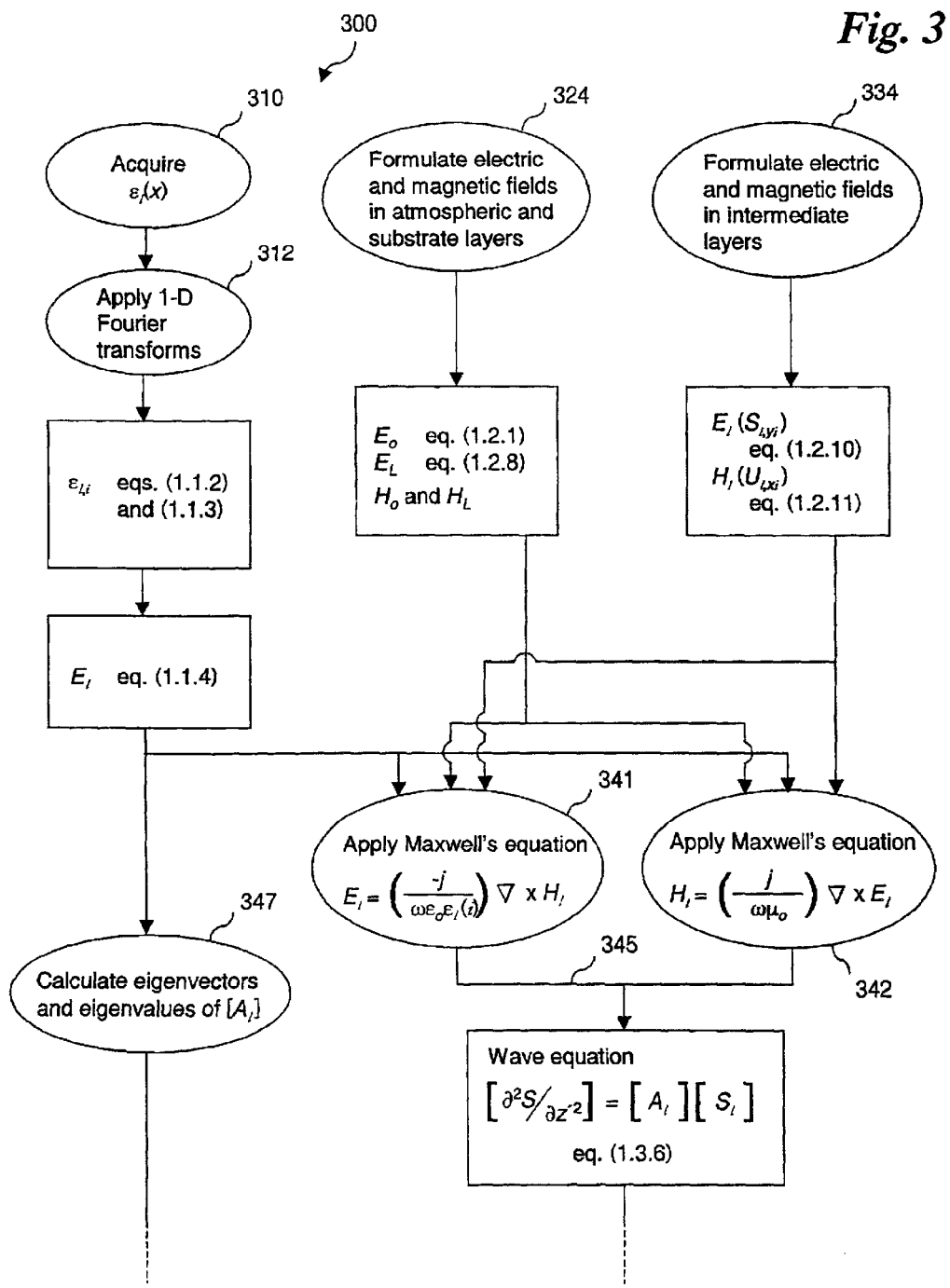
FIG. 3 shows a process flow of a TE-polarization rigorous coupled-wave analysis.
Figure 3:
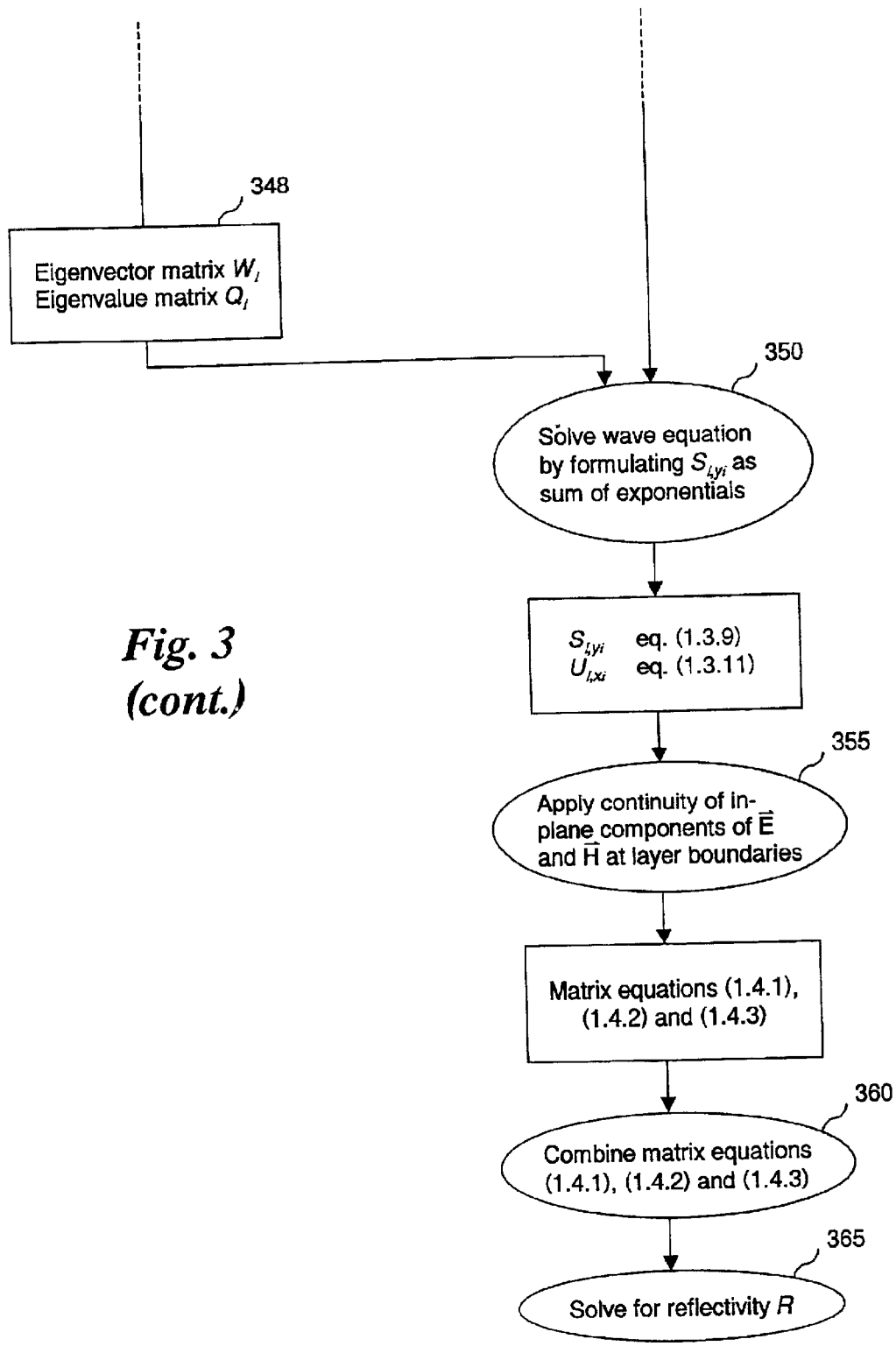
Figure 4:
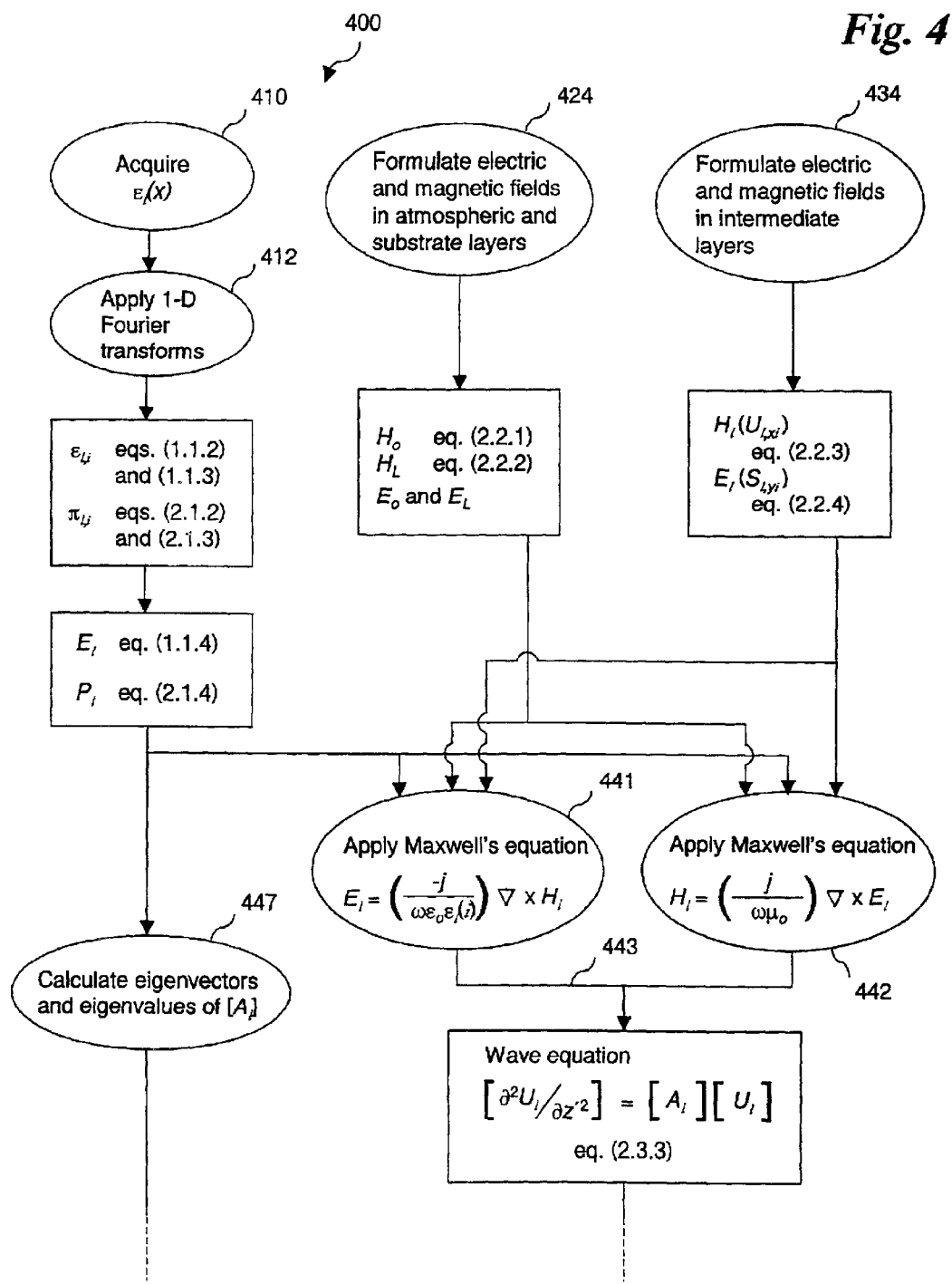
FIG. 4 shows a process flow for a TM-polarization rigorous coupled-wave analysis.
Figure 4:
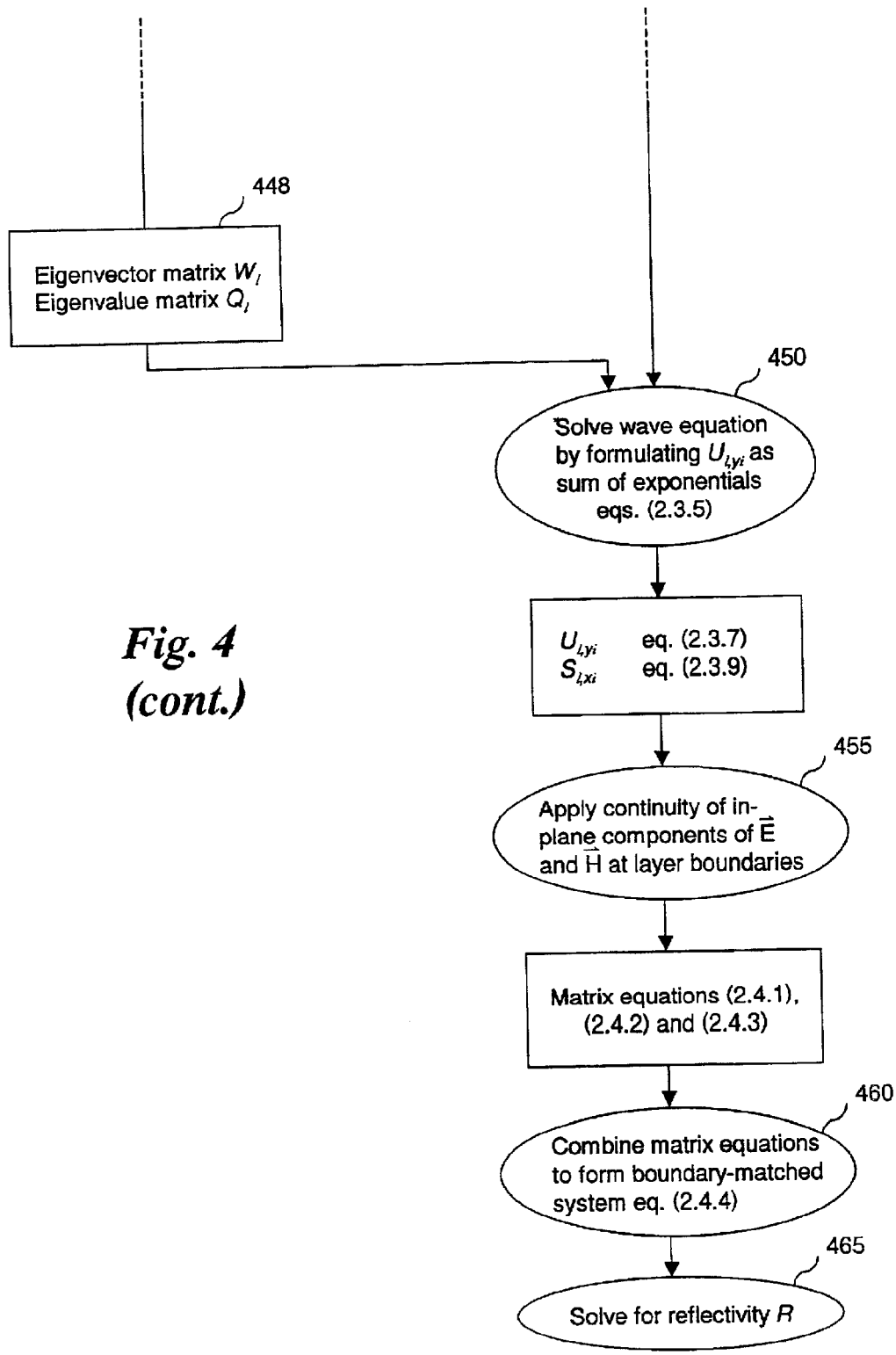

The method (400) of calculation for the diffracted reflectivity of TM-polarized incident electromagnetic radiation (131) shown in FIG. 4 parallels that (300) described above and shown in FIG. 3 for the diffracted reflectivity of TE-polarized incident electromagnetic radiation (131). The variables describing the geometry of the grating (100) and the geometry of the incident radiation (131) are as shown in FIGS. 1 and 2. However, for TM-polarized incident radiation (131) the electric field vector $\overline{E}$ is in the plane of incidence (140), and the magnetic field vector $\overline{H}$ is perpendicular to the plane of incidence (140). (The similarity in the TE- and TM-polarization RCWA calculations and the application of the present invention motivates the use of the term 'electromagnetic field' in the present specification to refer generically to either or both the electric field and/or the magnetic field of the electromagnetic radiation.)

As above, once the permittivity $\epsilon_l(x)$ is determined or acquired (410), the permittivity harmonics $\epsilon_{l,i}$ are determined (412) using Fourier transforms according to equations (1.1.2) and (1.1.3), and the permittivity harmonics matrix $E_l$ is assembled as per equation (1.1.4). In the case of TM-polarized incident radiation (131), it has been found that the accuracy of the calculation may be improved by formulating the calculations using inverse-permittivity harmonics $\pi_{l,i}$, since this will involve the inversion of matrices which are less singular. In particular, the one-dimensional Fourier expansion (412) for the inverse of the permittivity $\epsilon_l(x)$ of the lth layer is given by $$\frac{1}{\epsilon_l(x)} = \sum_{h=-\infty}^{\infty} \pi_{l,h} \exp\left(j\frac{2\pi h}{D}x\right). \quad (2.1.1)$$

Therefore, via the inverse Fourier transform this provides $$\pi_{l,0} = \frac{1}{n_r^2}\frac{d_l}{D} + \frac{1}{n_0^2}\left(1 - \frac{d_l}{D}\right), \quad (2.1.2)$$

and for h not equal to zero, $$\pi_{l,h} = \left(\frac{1}{n_r^2} - \frac{1}{n_0^2}\right)\frac{\sin\left(\pi h\frac{d_l}{D}\right)}{\pi h}e^{-j\pi h\beta/D}, \quad (2.1.3)$$

where $\beta$ is the x-offset of the center of the rectangular ridge slab (126.1) from the origin. The inverse-permittivity harmonics matrix $P_l$ is defined as $$P_l = \begin{bmatrix} \pi_{l,0} & \pi_{l,-1} & \pi_{l,-2} & \cdots & \pi_{l,-2o} \\ \pi_{l,1} & \pi_{l,0} & \pi_{l,-1} & \cdots & \pi_{l,-(2o-1)} \\ \pi_{l,2} & \pi_{l,1} & \pi_{l,0} & \cdots & \pi_{l,-(2o-1)} \\ \cdots & \cdots & \cdots & \cdots & \cdots \\ \pi_{l,2o} & \pi_{l,(2o-1)} & \pi_{l,(2o-2)} & \cdots & \pi_{l,0} \end{bmatrix}, \quad (2.1.4)$$

where 2o is the maximum harmonic order of the inverse permittivity $\pi_{l,h}$ used in the calculation. As with the case of the TE polarization (300), for electromagnetic fields $\overline{E}$ and $\overline{H}$ calculated to order o it is necessary to use harmonic components of the permittivity $\epsilon_{l,h}$ and inverse permittivity $\pi_{l,h}$ to order 2o.

In the atmospheric layer the magnetic field $\overline{H}$ is formulated (424) a priori as a plane wave incoming at an angle of incidence $\theta$, and a reflected wave which is a sum of plane waves having wave vectors $(k_{xi}, k_{0,zi})$ satisfying the Floquet condition, equation (1.2.6). In particular, $$\vec{H}_{0,y} = \exp(-jk_0n_0(\sin\theta x + \cos\theta z) + \quad (2.2.1)$$
$$\sum_i R_i \exp(-j(k_{xi}x - k_{0,zi}z)),$$

where the term on the left of the right-hand side of the equation is the incoming plane wave, and $R_i$ is the magnitude of the ith component of the reflected wave. The wave vectors $k_0$ and $(k_{xi}, k_{0,zi})$ are given by equations (1.2.2), (1.2.3), and (1.2.4) above, and the magnetic field $\overline{H}$ in the atmospheric layer (101) is generated from the electric field $\overline{E}$ by Maxwell's equation (1.3.2). In the substrate layer (105) the magnetic field $\overline{H}$ is formulated (424) as a transmitted wave which is a sum of plane waves where the wave vectors $(k_{xi}, k_{0,zi})$ satisfy the Floquet condition, equation (1.2.6), i.e., $$\vec{H}_{L,y} = \sum_i T_i \exp\left(-j\left(k_{xi}x + k_{L,zi}\left(z - \sum_{l=1}^{L-1} t_l\right)\right)\right), \quad (2.2.2)$$

where $k_{L,zi}$ is defined in equation (1.2.9). Again based on the Floquet condition, the magnetic field $\overline{H}_{l,y}$ in the lth layer is formulated (434) as a plane wave expansion along the direction of periodicity, $\hat{x}$, i.e., $$\vec{H}_{l,y} = \sum_i U_{l,yi}(z)\exp(-jk_{xi}x),  \quad (2.2.3)$$

where $U_{l,yi}(z)$ is the z-dependent magnetic field harmonic amplitude for the lth layer and the ith harmonic. Similarly, the electric field $\vec{E}_{l,x}$ in the lth layer is formulated (434) as a plane wave expansion along the direction of periodicity, i.e., $$\vec{E}_{l,x} = j\left(\frac{\mu_0}{\varepsilon_0}\right)^{1/2}\sum_i S_{l,xi}(z)\exp(-jk_{xi}x),  \quad (2.2.4)$$

where $S_{l,xi}(z)$ is the z-dependent electric field harmonic amplitude for the lth layer and the ith harmonic.

Substituting equations (2.2.3) and (2.2.4) into Maxwell's equation (1.3.2) provides (441) a first relationship between the electric and magnetic field harmonic amplitudes $S_l$ and $U_l$ for the lth layer:

$$\frac{\partial[U_{l,yi}]}{\partial z'} = [E_l][S_{l,xi}].  \quad (2.3.1)$$

Similarly, substituting (2.2.3) and (2.2.4) into Maxwell's equation (1.3.1) provides (442) a second relationship between the electric and magnetic field harmonic amplitudes $S_l$ and $U_l$ for the lth layer:

$$\frac{\partial[S_{l,xi}]}{\partial z'} = ([K_x][P_l][K_x] - [I])[U_{l,y}].  \quad (2.3.2)$$

where, as above, $K_x$ is a diagonal matrix with the (i,i) element being equal to $(k_{xi}/k_0)$. In contrast with equations (1.3.3) and (1.3.5) from the TE-polarization calculation, non-diagonal matrices in both equation (2.3.1) and equation (2.3.2) couple harmonic amplitudes $S_l$ and $U_l$ between harmonic orders.

Combining equations (2.3.1) and (2.3.2) provides a second-order differential wave equation $$\left[\frac{\partial^2 U_{l,y}}{\partial z'^2}\right] = \{[E_l]([K_x][P_l][K_x] - [I])\}[U_{l,y}],  \quad (2.3.3)$$

where $[U_{l,y}]$ and $[\delta^2 U_{l,y}/\delta z'^2]$ are column vectors with indices running from $-o$ to $+o$, and the permittivity harmonics $[E_l]$ is defined above in equation (1.1.7), and $z'=k_0 z$. The wave-vector matrix $[A_l]$ for equation (2.3.3) is defined as $$[A_l]=[E_l]([K_x][P_l][K_x]-[I]).  \quad (2.3.4)$$

If an infinite number of harmonics could be used, then the inverse of the permittivity harmonics matrix $[E_l]$ would be equal to the inverse-permittivity harmonics matrix $[P_l]$, and vice versa, i.e., $[E_l]^{-1}=[P_l]$, and $[P_l]^{-1}=[E_l]$. However, the equality does not hold when a finite number o of harmonics is used, and for finite o the singularity of the matrices $[E_l]^{-1}$ and $[P_l]$, and the singularity of the matrices $[P_l]^{-1}$ and $[E_l]$, will generally differ. In fact, it has been found that the accuracy of RCWA calculations will vary depending on whether the wave-vector matrix $[A_l]$ is defined as in equation (2.3.4), or $$[A_l]=[P_l]^{-1}([K_x][E_l]^{-1}[K_x]-[I]),  \quad (2.3.5)$$

or $$[A_l]=[E_l]([K_x][E_l]^{-1}[K_x]-[I]).  \quad (2.3.6)$$

It should also be understood that although the case where $$[A_l]=[P_l]^{-1}([K_x][P_l][K_z]-[1])  \quad (2.3.6')$$

does not typically provide convergence which is as good as the formulations of equation (2.3.5) and (2.3.6), the present invention may also be applied to the formulation of equation (2.3.6').

Regardless of which of the three formulations, equations (2.3.4), (2.3.5) or (2.3.6), for the wave-vector matrix $[A_l]$ is used, the solution of equation (2.3.3) is performed by writing (450) the homogeneous solution for the magnetic field harmonic amplitude $U_l$ as an expansion in pairs of exponentials, i.e., $$U_{l,yi}(z) = \sum_{m=1}^{2o+1} w_{l,i,m}[c1_{l,m}\exp(-k_0 q_{l,m}z) + \quad (2.3.7)$$
$$c2_{l,m}\exp(k_0 q_{l,m}(z-t_l))].$$

since its functional form is maintained upon second-order differentiation by z', and equation (2.3.3) becomes an eigenequation. Solution (447) of the eigenequation $$[A_l][W_l]=[\tau_l][W_l],  \quad (2.3.8)$$

provides (448) an eigenvector matrix $[W_l]$ formed from the eigenvectors $w_{l,i}$ of the wave-vector matrix $[A_l]$, and a diagonal eigenvalue matrix $[\tau_l]$ formed from the eigenvalues $\tau_{l,i}$ of the wave-vector matrix $[A_l]$. A diagonal root-eigenvalue matrix $[Q_l]$ is formed of diagonal entries $q_{l,i}$ which are the positive real portion of the square roots of the eigenvalues $\tau_{l,i}$. The constants c1 and c2 of equation (2.3.7) are, as yet, undetermined.

By applying equation (1.3.3) to equation (2.3.5) it is found that $$S_{l,xi}(x) = \sum_{m=1}^{2o+1} v_{l,i,m}[-c1_{l,m}\exp(-k_0 q_{l,m}z) + \quad (2.3.9)$$
$$c2_{l,m}\exp(k_0 q_{l,m}(z-t_l))]$$

where the vectors $v_{l,i}$ form a matrix $[V_l]$ defined as (2.3.10)
$[V]=[E]^{-1}[W][Q]$ when $[A]$ is defined as in equation (2.3.4), $[V]=[P][Q]$ when " " (2.3.5),  (2.3.11)

$[V]=[E]^{-1}[W][Q]$ when " " (2.3.6).  (2.3.12)

The formulation of equations (2.3.5) and (2.3.11) typically has improved convergence performance (see P. Lalanne and G. M. Morris, "Highly Improved Convergence of the Coupled-Wave Method for TM Polarization", J. Opt. Soc. Am. A, 779–784, 1996; and L. Li and C. Haggans, "Convergence of the coupled-wave method for metallic lamellar diffraction gratings", J. Opt. Soc. Am. A, 1184–1189, June 1993) relative to the formulation of equations (2.3.4) and (2.3.11) (see M. G. Moharam and T. K. Gaylord, "Rigorous Coupled-Wave Analysis of Planar-Grating Diffraction", J. Opt. Soc. Am., vol. 71, 811–818, July 1981).

The constants c1 and c2 in the homogeneous solutions of equations (2.3.7) and (2.3.9) are determined by applying (455) the requirement that the tangential electric and tangential magnetic fields be continuous at the boundary between each pair of adjacent layers (125.l)/(125.(l+1)), when the materials in each layer non-conductive. (The calculation of the present specification is straightforwardly modified to circumstances involving conductive materials, and the application of the method of the present invention to periodic gratings which include conductive materials is considered to be within the scope of the present invention. At the boundary between the atmospheric layer (101) and the first layer (125.1), continuity of the magnetic field $H_y$ and the electric field $E_x$ requires $$\begin{bmatrix} \delta_{i0} \\ j\cos(\theta)\delta_{i0}/n_0 \end{bmatrix} + \begin{bmatrix} I \\ -jZ_0 \end{bmatrix} R = \begin{bmatrix} W_1 & W_1 X_1 \\ V_1 & -V_1 X_1 \end{bmatrix} \begin{bmatrix} c1_1 \\ c2_1 \end{bmatrix} \quad (2.4.1)$$

where $Z_0$ is a diagonal matrix with entries $(k_{0,zi}/n_0^2 k_0)$, $X_l$ is a diagonal matrix with elements $\exp(-k_0 q_{l,m}t_l)$, the top half of the vector equation provides matching of the magnetic field $H_y$ across the layer boundary, the bottom half of the vector equation provides matching of the electric field $E_x$ across the layer boundary, the vector on the far left is the contribution from the incoming radiation (131) in the atmospheric layer (101), the second vector on the left is the contribution from the reflected radiation (132) in the atmospheric layer (101), and the portion on the right represents the fields $H_y$ and $E_z$ in the first layer (125.1).

At the boundary between adjacent intermediate layers (125.l) and (125.(l+1)), continuity of the electric field $E_y$ and the magnetic field $H_x$ requires $$\begin{bmatrix} W_{l-1}X_{l-1} & W_{l-1} \\ W_{l-1}X_{l-1} & -V_{l-1} \end{bmatrix} \begin{bmatrix} c1_{l-1} \\ c2_{l-2} \end{bmatrix} = \begin{bmatrix} W_l & W_l X_l \\ V_l & -V_l X_l \end{bmatrix} \begin{bmatrix} c1_l \\ c2_l \end{bmatrix}, \quad (2.4.2)$$

where the top and bottom halves of the vector equation provides matching of the magnetic field $H_y$ and the electric field $E_x$, respectively, across the layer boundary.

At the boundary between the (L–1)th layer (125.(L–1)) and the substrate layer (105), continuity of the electric field $E_y$ and the magnetic field $H_x$ requires $$\begin{bmatrix} W_{L-1}X_{L-1} & W_{L-1} \\ V_{L-1}X_{L-1} & -V_{L-1} \end{bmatrix} \begin{bmatrix} c1_{L-1} \\ c2_{L-2} \end{bmatrix} = \begin{bmatrix} I \\ jZ_L \end{bmatrix} T, \quad (2.4.3)$$

where, as above, the top and bottom halves of the vector equation provides matching of the magnetic field $H_y$ and the electric field $E_x$, respectively. In contrast with equation (2.4.1), there is only a single term on the right in equation (2.4.3) since there is no incident radiation in the substrate (105).

Matrix equation (2.4.1), matrix equation (2.4.3), and the (L–1) matrix equations (2.4.2) can be combined (460) to provide a boundary-matched system matrix equation $$\begin{bmatrix} -I & W_1 & W_1 X_1 & 0 & 0 & \cdots \\ jZ_0 & V_1 & -VX & 0 & 0 & \cdots \\ 0 & -W_1 X_1 & -W_1 & W_2 & W_2 X_2 & 0 & 0 & \cdots \\ 0 & -V_1 X_1 & V_1 & V_1 & -V_2 X_2 & 0 & 0 & \cdots \\ 0 & 0 & \ddots & & \ddots & & \vdots \\ 0 & 0 & & & & & \\ & & \cdots & -W_{L-1}X_{L-1} & -W_{L-1} & I \\ & & & -V_{L-1}X_{L-1} & V_{L-1} & jZ_L \end{bmatrix} \begin{bmatrix} R \\ c1_1 \\ c2_1 \\ \vdots \\ \vdots \\ c1_{L-1} \\ c2_{L-1} \\ T \end{bmatrix} = \quad (2.4.4)$$

$$\begin{bmatrix} \delta_{i0} \\ j\delta_{i0}\cos(\theta)/n_0 \\ 0 \\ \vdots \\ \vdots \\ 0 \end{bmatrix}$$

and the boundary-matched system matrix equation (2.4.4) may be solved (465) to provide the reflectivity R for each harmonic order i. (Alternatively, the partial-solution approach described in "Stable Implementation of the Rigorous Coupled-Wave Analysis for Surface-Relief Dielectric Gratings: Enhanced Transmittance Matrix Approach", E. B. Grann and D. A. Pommet, *J. Opt. Soc. Am. A*, vol. 12, 1077–1086, May 1995, can be applied to calculate either the diffracted reflectivity R or the diffracted transmittance T.)

4. Solving for the Diffracted Reflectivity

The matrix on the left in boundary-matched system matrix equations (1.4.4) and (2.4.4) is a square non-Hermetian complex matrix which is sparse (i.e., most of its entries are zero), and is of constant block construction (i.e., it is an array of sub-matrices of uniform size). According to the preferred embodiment of the present invention, and as is well-known in the art of the solution of matrix equations, the matrix is stored using the constant block compressed sparse row data structure (BSR) method (see S. Carney, M. Heroux, G. Li, R. Pozo, K. Remington and K. Wu, "A Revised Proposal for a Sparse BLAS Toolkit," http://www.netlib.org, 1996). In particular, for a matrix composed of a square array of square sub-matrices, the BSR method uses five descriptors:

B_LDA is the dimension of the array of sub-matrices;
O is the dimension of the sub-matrices;
VAL is a vector of the non-zero sub-matrices starting from the leftmost non-zero matrix in the top row (assuming that there is a non-zero matrix in the top row), and continuing on from left to right, and top to bottom, to the rightmost non-zero matrix in the bottom row (assuming that there is a non-zero matrix in the bottom row).
COL_IND is a vector of the column indices of the sub-matrices in the VAL vector; and
ROW_PTR is a vector of pointers to those sub-matrices in VAL which are the first non-zero sub-matrices in each row.

For example, for the left-hand matrix of equation (1.4.4), B_LDA has a value of 2L, O has a value of 2o+1, the entries of VAL are $(-I, W_1, W_1X_1, jY_0, V_1, -V_1X_1, -W_1X_1, -W_1, W_2, W_2X_2, -V_1X_1, V_1, V_2, \ldots)$, the entries of COL_IND are $(1, 2, 3, 1, 2, 3, 2, 3, 4, 5, 2, 3, 4, 5, \ldots)$, and the entries of ROW_PTR are $(1, 4, 7, 11, \ldots)$.

According to the preferred embodiment of the present invention, and as is well-known in the art of the solution of matrix equations, the squareness and sparseness of the left-hand matrices of equations (1.4.4) and (2.4.4) are used to advantage by solving equations (1.4.4) and (2.4.4) using the Blocked Gaussian Elimination (BGE) algorithm. The BGE algorithm is derived from the standard Gaussian Elimination algorithm (see, for example, Numerical Recipes, W. H. Press, B. P. Flannery, S. A. Teukolsky, and W. T. Vetterling, Cambridge University Press, Cambridge, 1986, pp. 29–38) by the substitution of sub-matrices for scalars.

According to the Gaussian Elimination method, the left-hand matrix of equation (1.4.4) or (2.4.4) is decomposed into the product of a lower triangular matrix [L], and an upper triangular matrix [U], to provide an equation of the form $$[L] [U] [x]=[b].\qquad(3.1.1)$$

and then the two triangular systems [U] [x]=[y] and [L] [y]=[b] are solved to obtain the solution $[x]=[U]^{-1} [L]^{-1} [b]$, where, as per equations (1.4.4) and (2.4.4), [x] includes the diffracted reflectivity R.

5. Caching of Permittivity Harmonics and Eigensolutions

As presented above, the calculation of the diffraction of incident TE-polarized or TM-polarized incident radiation (131) from a periodic grating involves the generation of a boundary-matched system matrix equation (1.4.4) or (2.4.4), respectively, and its solution. In understanding the advantages of the present invention it is important to appreciate that the most computationally expensive portion of the processes of FIGS. 3 and 4 is the solution (347) and (447) for the eigenvectors $w_{l,i}$ and eigenvalues $\tau_{l,i}$ of wave-vector matrix $[A_l]$ of equation (1.3.7), (2.3.4), (2.3.5) or (2.3.6). The accuracy of the calculation of the eigenvectors $w_{l,i}$ and eigenvalues $\tau_{l,i}$ is dependent on the number of orders o utilized. As the number of orders o is increased, the computation time for solving the eigensystem increases exponentially with o. When performed in a typical computing environment with o=9 harmonic orders, the calculation of the eigenvectors and eigenvalues can take more than 85% of the total computation time.

The method of the present invention is implemented on a computer system (800) which in its simplest form consists of information input/output (I/O) equipment (805), which is interfaced to a computer (810) which includes a central processing unit (CPU) (815) and a memory (820). The I/O equipment (805) will typically include a keyboard (802) and mouse (804) for the input of information, and a display (801) and printer (803) for the output of information. Many variations of this simple computer system (800) are to be considered within the scope of the present invention, including systems with multiple I/O devices, multiple processors within a single computer, multiple computers connected by Internet linkages, multiple computers connected by local area networks, devices that incorporate CPU (815), memory (820), and I/O equipment (805) into a single unit, etc. For instance, the method of the present invention may be applied to any of the systems described in provisional patent application Ser. No. 60/178,540, filed Jan. 26, 2000, entitled Profiler Business Model, by the present inventors, and provisional patent application Ser. No. 60/209,424, filed Jun. 2, 2000, entitled Profiler Business Model, by the present inventors, both of which are incorporated herein by reference.

According to the method and apparatus of the present invention, portions of the analysis of FIG. 3 are pre-computed and cached, thereby reducing the computation time required to calculate the diffracted reflectivity produced by a periodic grating. Briefly, the pre-computation and caching portion of the present invention consists of:

pre-computation and caching (i.e., storage in a look-up table) of the permittivity $\epsilon_\mu(x)$, the harmonic components $\epsilon_{\mu,i}$ of the permittivity $\epsilon_\mu(x)$ and the permittivity harmonics matrix $[E_\mu]$, and/or the inverse-permittivity harmonics $\pi_{\mu,i}$ and the inverse-permittivity harmonics matrix $[P_\mu]$ for a sampling region $\{\mu\}$ of layer-property values;

pre-computation and caching of the wave-vector matrix $[A_{\mu,\kappa}]$ for the sampling region $\{\mu\}$ of layer-property values and a sampling region $\{\kappa\}$ of incident-radiation values; and pre-computation and caching of eigenvectors $w_{\mu,\kappa,m}$ and eigenvalues $\tau_{\mu,\kappa,m}$ of the wave-vector matrix $[A_{\mu,\kappa}]$ to form an eigenvector matrix $[W_{\mu,\kappa}]$, a root-eigenvalue matrix $[Q_{\mu,\kappa}]$, and a compound matrix $[V_{\mu,\kappa}]$, respectively, for a master sampling region $\{\mu, \kappa\}$ formed from the combination of the layer-property sampling region $\{\mu\}$ and the incident-radiation sampling region $\{\kappa\}$; Briefly, the use of the master sampling region $\{\mu\kappa\}$ of pre-computed and cached eigenvector matrices $[W_{\mu\kappa}]$, root-eigenvalue matrices $[Q_{\mu\kappa}]$, and product matrices $[V_{\mu\kappa}]$ to calculate the diffraction spectrum from a periodic grating consists of the steps of:

construction of matrix equation (1.4.4) or (2.4.4) by retrieval of cached eigenvector matrices $[W_{\mu,\kappa}]$,root-eigenvalue matrices $[Q_{\mu,\kappa}]$, and product matrices $[V_{\mu,\kappa}]$ from the master sampling region $\{\mu, \kappa\}$ corresponding to the layers 125 of the grating (100) under consideration; and solution of the matrix equation (1.4.4) or (2.4.4) to determine the diffracted reflectivity $R_i$ for each harmonic order i.

Figure 7A:
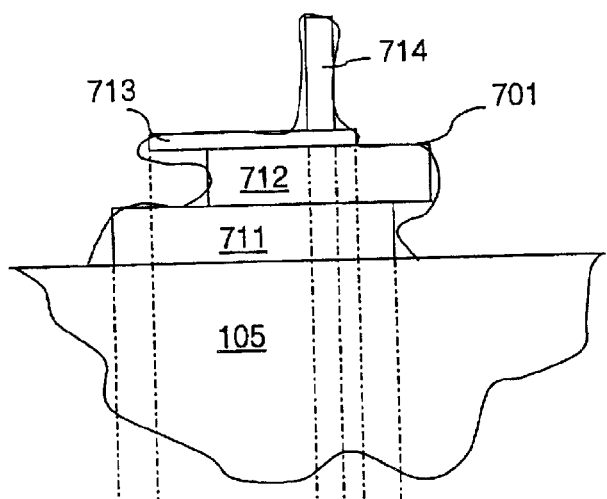
FIG. 7A shows an exemplary ridge profile which is discretized into four stacked rectangular sections.
Figure 7B:
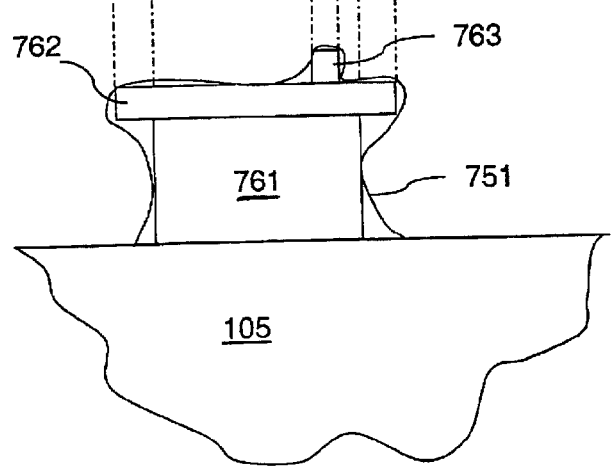
FIG. 7B shows an exemplary ridge profile which is discretized into three stacked rectangular sections, where the rectangular sections have the same dimensions and x-offsets as three of the rectangular section found in the ridge discretization of FIG. 7A.

The method of the present invention is illustrated by consideration of the exemplary ridge profiles (701) and (751) shown in cross-section in FIGS. 7A and 7B, respectively. The profile (701) of FIG. 7A is approximated by four slabs (711), (712), (713) and (714) of rectangular cross-section. Similarly, the profile (751) of FIG. 7B is approximated by three slabs (761), (762), and (763) of rectangular cross-section. The two exemplary ridge profiles (701) and (751) are each part of an exemplary periodic grating (other ridges not shown) which have the same grating period D, angle θ of incidence of the radiation (131), and radiation wavelength λ. Furthermore, slabs (713) and (761) have the same ridge slab width d, x-offset β, and index of refraction $n_r$, and the index of refraction $n_0$ of the atmospheric material between the ridges (701) and (751) is the same. Similarly, slabs (711) and (762) have the same ridge slab width d, x-offset β, and index of refraction $n_r$, and slabs (714) and (763) have the same ridge slab width d, x-offset β, and index of refraction $n_r$. However, it should be noted that slabs (714) and (763) do not have the same thicknesses t, nor do slabs (713) and (761) or slabs (711) and (762) have the same thicknesses t. It is important to note that thickness t is not a parameter upon which the wave-vector matrix [A] is dependent, although thickness t does describe an intra-layer property. It should also be noted that the present invention may be implemented with ridges mounted directly on a substrate, or ridges mounted on films deposited on a substrate, since a film can be considered to be a ridge having a width d equal to the pitch D.

In performing an RCWA calculation for the diffracted reflectivity from grating composed of profiles (701), the eigenvector matrices [W], the root-eigenvalue matrices [Q], and the compound eigensystem matrices [V] are computed for rectangular slabs (711), (712), (713), and (714). According to the present invention it is noted that the eigenvector matrices [W], the root-eigenvalue matrices [Q], and the compound eigensystem matrices [V] for slabs (761), (762) and (763) are the same as the eigenvector matrices [W], the root-eigenvalue matrices [Q], and the compound eigensystem matrices [V] for slabs (713), (711) and (714), respectively, since the wave-vector matrices [A] are the same for slabs (711) and (762), (713) and (761), and (714) and (763). Therefore, caching and retrieval of the eigensystem matrices [W], [Q], and [V] for slabs (713), (711) and (714) would prevent the need for recalculation of eigensystem matrices [W], [Q], and [V] for slabs (761), (762) and (763), and reduce the computation time. More broadly, the pre-calculation and caching of eigensystem matrices [W], [Q], and [V] for useful ranges and samplings of intra-layer parameters and incident-radiation parameters can reduce the computation time necessary to perform RCWA calculations.

Figure 5:
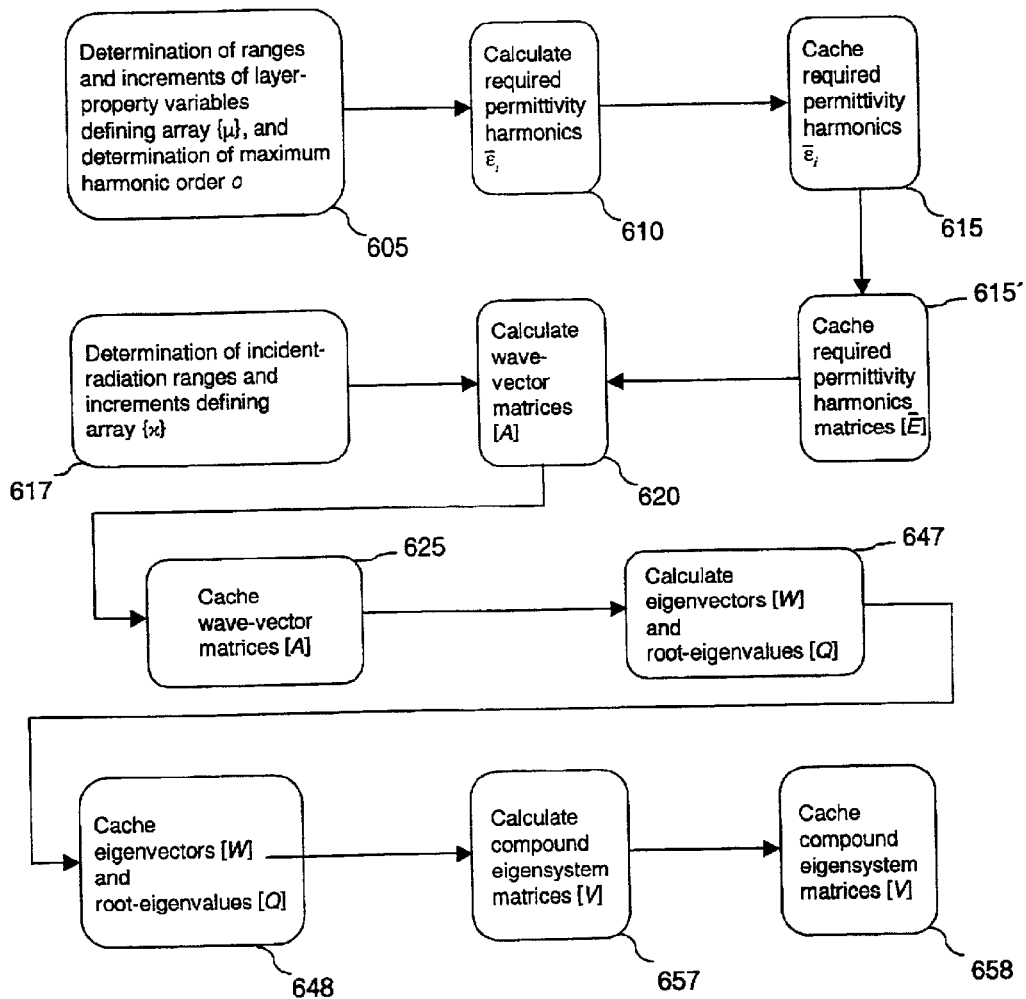
FIG. 5 shows a process flow for the pre-computation and caching of calculation results dependent on intra-layer and incident-radiation parameters according to the method of the present invention.

As can be seen from equations (1.1.2), (1.1.3), (2.1.2) and (2.1.3), the permittivity harmonics $\epsilon_{l,i}$ and the inverse permittivity harmonics $\pi_{l,i}$ are only dependent on the intra-layer parameters: the index of refraction of the ridges $n_r$, the index of refraction of the atmospheric material $n_0$, the pitch D, the ridge slab width d, and the x-offset $\beta$. As shown in the flowchart of FIG. 5, in one exemplary embodiment, the system (600) of the present invention begins with the determination (605) of the ranges $n_{r,min}$ to $n_{r,max}$, $n_{0,min}$ to $n_{0,max}$, $D_{min}$ to $D_{max}$, $d_{min}$ to $d_{max}$, and $\beta_{min}$ to $\beta_{max}$, and increments $\delta n_r$, $\delta n_0$, $\delta D$, $\delta d$, and $\delta\beta$ for the layer-property parameters, i.e., the index of refraction of the ridges $n_r$, the index of refraction of the atmospheric material $n_0$, the pitch D, the ridge slab width d, the x-offset $\beta$, as well as the determination (605) of the maximum harmonic order o. This information is forwarded from an I/O device (805) to the CPU (815). Typically, when applied to periodic gratings produced by semiconductor fabrication techniques, the ranges $n_{r,min}$ to $n_{r,max}$, $n_{0,min}$ to $n_{0,max}$, $D_{min}$ to $D_{max}$, $d_{min}$ to $d_{max}$, and $\beta_{min}$ to $\beta_{max}$ are determined based on knowledge and expectations regarding the fabrication materials, the fabrication process parameters, and other measurements taken of the periodic grating (100) or related structures. Similarly, when matching calculated diffraction spectra to a measured diffraction spectrum to determine the dimensions of the periodic grating that created the measured diffraction spectrum, the increments $\delta n_r$, $\delta n_0$, $\delta D$, $\delta d$, and $\delta\beta$, and maximum harmonic order o, are chosen based on the resolution to which the layer-property parameters $n_r$, $n_0$, D, d and $\beta$ are to be determined. The layer-property parameter ranges $n_{r,min}$ to $n_{r,max}$, $n_{0,min}$ to $n_{0,max}$, $D_{min}$ to $D_{max}$, $d_{min}$ to $d_{max}$, and $\beta_{min}$ to $\beta_{max}$ and increments $\delta n_r$, $\delta n_0$, $\delta D$, and $\delta d$, and $\delta\beta$ define a five-dimensional layer-property caching grid $\{\mu\}$. More specifically, the caching grid $\{\mu\}$ consists of layer-property points with the $n_r$ coordinates being $\{n_{r,min}, n_{r,min}+\delta n_r, n_{r,min}+2\delta n_r, \ldots, n_{r,max}-2\delta n_r, n_{r,max}-\delta n_r, n_{r,max}\}$, the $n_0$ coordinates being $\{n_{0,min}, n_{0,min}+\delta n_0, n_{0,min}+2\delta n_0, \ldots, n_{0,max}-2\delta n_0, n_{0,max}-\delta n_0, n_{0,max}\}$, the D coordinates being $\{D_{min}, D_{min}+\delta D, D_{min}+2\delta D, \ldots, D_{max}-2\delta D, D_{max}-\delta D, D_{max}\}$, the d coordinates being $\{d_{min}, d_{min}+\delta d, d_{min}+2\delta d, \ldots, d_{max}-2\delta d, d_{max}-\delta d, d_{max}\}$, and the $\beta$ coordinates being $\{\beta_{min}, \beta_{min}+\delta\beta, \beta_{min}+2\delta\beta, \ldots, \beta_{max}-2\delta\beta, \beta_{max}-\delta\beta, \beta_{max}\}$. In other words, the layer-property caching grid $\{\mu\}$ is defined as a union of five-dimensional coordinates as follows:

$$\{\mu\} = \bigcup_{i,j,k,l,m} (n_{r,\min} + i\delta n_r, n_{0,\min} + j\delta n_0, D_{\min} + k\delta D, \quad (4.1.1)$$
$$d_{\min} + l\delta d, \beta_{\min} + m\delta\beta),$$

where i, j, k, l and m are integers with value ranges of $$0 \leq i \leq (n_{r,max}-n_{r,min})/\delta n_r, \quad (4.1.2a)$$

$$0 \leq j \leq (n_{0,max}-n_{0,min})/\delta n_0, \quad (4.1.2b)$$

$$0 \leq k \leq (D_{max}-D_{min})/\delta D, \quad (4.1.2c)$$

$$0 \leq l \leq (d_{max}-d_{min})/\delta d, \quad (4.1.2d)$$

and $$0 \leq m \leq (\beta_{max}-\beta_{min})/\delta\beta. \quad (4.1.2e)$$

It should be noted that the variable l in equations (4.1.1) and (4.1.2d) is not to be confused with the layer number l used in many of the equations above. Furthermore, it may be noted that the layer subscript, l, is not used in describing the layer-property parameters $n_r$, $n_0$, D, d, and $\beta$ used in the layer-property caching grid $\{,\mu\}$ because each particular point $\mu_j$ in the layer-property caching grid $\{\mu\}$ may correspond to none, one, more than one, or even all of the layers of a particular periodic grating (100). It should also be understood that the layer-property parameter region need not be a hyper-rectangle, and the layer-property parameter region need not be sampled using a grid. For instance, the sampling of the layer-property parameter region may be performed using a stochastic sampling method. Furthermore, the sampling density of the layer-property parameter region need not be uniform. For instance, the sampling density (i.e., the sampling resolution) may decrease near the boundaries of the layer-property parameter region if layers (125) described by layer properties near the boundaries are less likely to occur.

As shown in FIG. 5, for each point $\mu_j$ in the layer-property caching grid $\{\mu\}$ the "required" permittivity harmonics $\bar{\epsilon}_l$ are calculated 410 by CPU (815) and cached (415) in memory (820), and the "required" permittivity harmonics matrices [$\bar{E}$] are compiled from the cached required permittivity harmonics $\bar{\epsilon}_l$ and cached (415') in memory (820). For RCWA analyses of TE-polarized incident radiation (131), or RCWA analyses of TM-polarized incident radiation (131) according to the formulation of equations (2.3.6) and (2.3.12), the required permittivity harmonics $\bar{\epsilon}_l$ are the permittivity harmonics $\epsilon_i$ calculated (410) according to equations (1.1.2) and (1.1.3), and the required permittivity harmonics matrix [$\bar{E}$] is the permittivity harmonics matrix [E] formed as per equation (1.1.4). Similarly, for RCWA analyses of TM-polarized incident radiation (131) according to the formulation of equations (2.3.5) and (2.3.11) or, equations (2.3.4) and (2.3.10), the required permittivity harmonics $\bar{\epsilon}_i$ are the permittivity harmonics $\epsilon_i$ calculated (410) according to equations (1.1.2) and (1.1.3) and the inverse-permittivity harmonics $\pi_i$ calculated (410) according to equations (2.1.2) and (2.1.3), and the required permittivity harmonics matrices [$\bar{E}$] are the permittivity harmonics matrix [E] formed from the permittivity harmonics $\epsilon_i$ as per equation (1.1.4) and the inverse-permittivity harmonics matrix [P] formed from the inverse-permittivity harmonics $\pi_i$ as per equation (2.1.4).

As per equations (1.3.7), (2.3.4), (2.3.5) and (2.3.6), the wave-vector matrix [A] is dependent on the required permittivity harmonics matrices [$\bar{E}$] and the matrix [$K_x$]. The matrix [$K_x$], in addition to being dependent on layer-property parameters (i.e., the atmospheric index of refraction $n_0$ and pitch D), is dependent on incident-radiation parameters, i.e., the angle of incidence $\theta$ and the wavelength $\lambda$ of the incident radiation (131). Therefore, as shown in the flowchart of FIG. 5, according to one embodiment of the present invention, ranges $\theta_{min}$ to $\theta_{max}$ and $\lambda_{min}$ to $\lambda_{max}$, and increments $\delta\theta$ and $\delta\lambda$ are determined (617) for the incidence angle $\theta$ and wavelength $\lambda$, and forwarded from an I/O device (805) to the CPU (815). The incident-radiation caching grid $\{\kappa\}$ is defined as a union of two-dimensional coordinates as follows:

$$\{\kappa\} = \bigcup_{n,o} (\theta_{\min} + n\delta\theta, \lambda_{\min} + o\delta\lambda) \quad (4.1.3)$$

where n and o are integers with value ranges of $$0 \leq n \leq (\theta_{max}-\theta_{min})/\delta\theta, \quad (4.1.4a)$$

$$0 \leq o \leq (\lambda_{max}-\lambda_{min})/\delta\lambda. \quad (4.1.4b)$$

(The variable o in equations (4.1.3) and (4.1.4b) is not to be confused with the maximum harmonic order o used in many of the equations above.) Furthermore, the master caching grid $\{\mu, \kappa\}$ is defined as a union of coordinates as follows:

$$\{\mu, \kappa\} = \bigcup_{i,j,k,l,m} (n_{r,min} + i\delta n_r, n_{0,min} + j\delta n_0, D_{min} + k\delta D, d_{min} +$$

$$l\delta d, \beta_{min} + m\delta \beta, \theta_{min} + \delta\theta, \lambda_{min} + m\delta\lambda)$$

where i, j, k, l, m, n and o satisfy equations (4.1.2a), (4.1.2b), (4.1.2c), (4.1.2d), (4.1.4a) and (4.1.4b). Typically, the ranges $\theta_{min}$ to $\theta_{max}$ and $\lambda_{min}$ to $\lambda_{max}$ are determined (617) based on knowledge and expectations regarding the apparatus (not shown) for generation of the incident radiation (131) and the apparatus (not shown) for measurement of the diffracted radiation (132). Similarly, the increments $\delta\theta$ and $\delta\lambda$ are determined (617) based on the resolution to which the layer-property parameters $n_r$, $n_0$, D, d, and $\beta$ are to be determined, and/or the resolution to which the incident-radiation parameters $\theta$ and $\lambda$ can be determined. For instance, the increments $\delta n_r$, $\delta n_0$, $\delta D$, $\delta d$, $\delta\beta$, $\delta\theta$, and $\delta\lambda$ may be determined as per the method disclosed in the provisional patent application entitled Generation of a Library of Periodic Grating Diffraction Spectra, filed Sep. 15, 2000 by the same inventors, and incorporated herein by reference. For each point in the master caching grid $\{\mu, \kappa\}$, the matrix [A] is calculated (620) by the CPU (815) according to equation (1.3.7), (2.3.4), (2.3.5) or (2.3.6) and cached (425).

It should be noted that if any of the layer-property parameters $n_r$, $n_0$, D, d, and $\beta$, or any of the incident-radiation parameters $\theta$ and $\lambda$, are known to sufficient accuracy, then a single value, rather than a range of values, of the variable may be used, and the dimensionality of the master caching grid $\{\mu, \kappa\}$ is effectively reduced. It should also be understood that incident-radiation parameter region need not be a hyper-rectangle, and the incident-radiation parameter region need not be sampled using a grid. For instance, the sampling of the incident-radiation parameter region may be performed using a stochastic sampling method. Furthermore, the sampling density of the incident-radiation parameter region need not be uniform. For instance, the sampling density may decrease near the boundaries of the the incident-radiation parameter region if radiation-incidence circumstances near the boundaries are less likely to occur.

Since the wave-matrix matrix [A] is only dependent on intra-layer parameters (index of refraction of the ridges $n_r$, index of refraction of the atmospheric material $n_0$, pitch D, ridge slab width d, x-offset $\beta$) and incident-radiation parameters (angle of incidence $\theta$ of the incident radiation (131), wavelength $\lambda$ of the incident radiation (131)), it follows that the eigenvector matrix [W] and the root-eigenvalue matrix [Q] are also only dependent on the layer-property parameters $n_r$, $n_0$, D, d, and $\beta$, and the incident-radiation parameters $\theta$ and $\lambda$. According to the preferred embodiment of the present invention, the eigenvector matrix [W] and its root-eigenvalue matrix [Q] are calculated (647) by the CPU (815) and cached (648) in memory (820) for each point in the master caching grid $\{\mu, \kappa\}$. The calculation (647) of the eigenvector matrices [W] and the root-eigenvalue matrices [Q] can be performed by the CPU (815) using a standard eigensystem solution method, such as singular value decomposition (see Chapter 2 of *Numerical Recipes*, W. H. Press, B. P. Glannery, S. A. Teukolsky and W. T. Vetterling, Cambridge University Press, 1986). The matrix [V], where [V]=[W] [Q], is then calculated (457) by the CPU (815) and cached (658) in memory (820).

Figure 6:
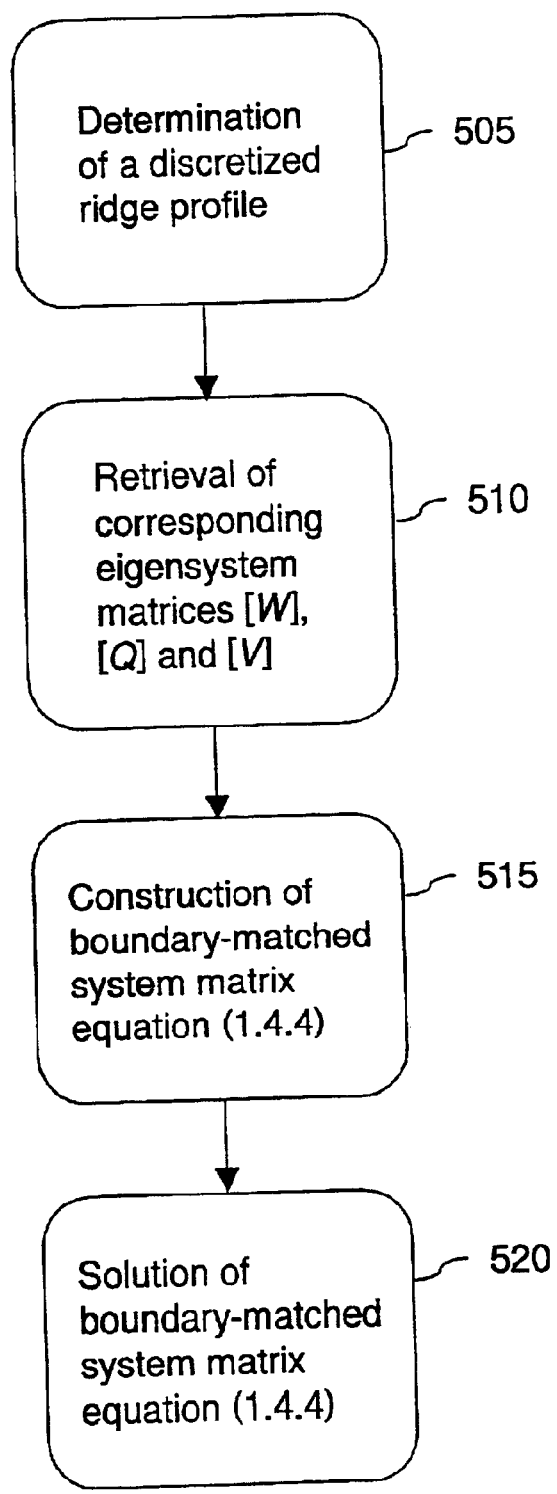
FIG. 6 shows a process flow for the use of cached calculation results dependent on intra-layer and incident-radiation parameters according to the method of the present invention.

The method of use of the pre-computed and cached eigenvector matrices $[W_{\mu,\kappa}]$, root-eigenvalue matrices $[Q_{\mu,\kappa}]$, and product matrices $[V_{\mu,\kappa}]$ according to the present embodiment of the invention is shown in FIG. 6. Use of the cached eigensystem matrices $[W_{\mu,\kappa}]$, $[Q_{\mu,\kappa}]$, and $[V_{\mu,\kappa}]$ begins by a determination (505) of the parameters describing a discretized ridge profile. In particular, the intra-layer parameters (i.e., index of refraction of the ridges $n_r$, the index of refraction of the atmospheric material $n_0$, the pitch D, the ridge slab width d, and the x-offset $\beta$) for each layer, and the incident-radiation parameters (i.e., the angle of incidence $\theta$ and the wavelength $\lambda$ of the incident radiation) are determined (505) and forwarded via an I/O device (805) to the CPU (815). The determination (505) of the discretized ridge profile may be a step in another process, such as a process for determining the ridge profile corresponding to a measured diffraction spectrum produced by a periodic grating.

Once the intra-layer and incident-radiation parameters are determined (505), the cached eigensystem matrices $[W_{\mu,\kappa}]$, $[Q_{\mu,\kappa}]$, and $[V_{\mu,\kappa}]$ for those intra-layer and incident-radiation parameters are retrieved (510) from memory (820) for use by the CPU (815) in constructing (515) the boundary-matched system matrix equation (1.4.4) or (2.4.4). The CPU (815) then solves (520) the boundary-matched system matrix equation (1.4.4) or (2.4.4) for the reflectivity $R_i$ of each harmonic order from −o to +o and each wavelength $\lambda$ of interest, and forwards the results to an output device (805) such as the display (801), printer (803), or the like.

6. Library Matching Methodology

The reflected phase and magnitude signals obtained, in the case of ellipsometry, and relative reflectance, in the case of reflectometry, from the profile extraction metrology setup are then compared to the library of profile-spectra pairs generated by the cached-coupled wave algorithm. The matching algorithms that can be used for this purpose range from simple least squares approach (linear regression) to a neural network based approach that associates features of the signal with the profile through a non-linear relationship to a principal component based regression scheme. Explanations of each of these methods is explained in numerous excellent text books on these topics such as Chapter 14 of "Mathematical Statistics and Data Analysis" by John Rice, Duxbury Press and Chapter 4 of "Neural Networks for Pattern Recognition" by Christopher Bishop, Oxford University Press.

It should be noted that although the invention has been described in term of a method, as per FIGS. 5 and 6, the invention may alternatively be viewed as an apparatus. For instance, the invention may implemented in hardware. In such case, the method flowchart of FIG. 5 would be adapted to the description of an apparatus by: replacement in step 605 of "Determination of ranges and increments of layer-property variables defining array $\{\mu\}$, and means for determination of maximum harmonic order o" with "Means for determination of ranges and increments of layer-property variables defining array $\{\mu\}$, and means for determination of maximum harmonic order o"; the replacement in step 617 of "Determination of incident-radiation ranges and increments defining array $\{\kappa\}$" with "Means for determination of incident-radiation ranges and increments defining array $\{\kappa\}$"; the replacement in steps 610, 620, 647, and 657 of "Calculate . . . " with "Means for Calculating . . . "; and the replacement in steps 615, 615', 625, 648 and 658 of "Cache . . . " with "Cache of . . . ".

In the same fashion, the method flowchart of FIG. 6 would be adapted to the description of an apparatus by: replacement of "Determination . . . " in step 505 with "Means for determination . . . "; replacement of "Retrieval . . . " in step 510 with "Means for retrieval . . . "; replacement of "Construction . . . " in step 515 with "Means for construction . . . "; and replacement of "Solution . . . " in step 520 with "Means for solution . . . ".

It should also be understood that the present invention is also applicable to off-axis or conical incident radiation 131 (i.e., the case where $\phi \neq 0$ and the plane of incidence 140 is not aligned with the direction of periodicity, $\hat{x}$, of the grating). The above exposition is straightforwardly adapted to the off-axis case since, as can be seen in "Rigorous Coupled-Wave Analysis of Planar-Grating Diffraction," M. G. Moharam and T. K. Gaylord, $J.\ Opt.\ Soc.\ Am.$, vol. 71, 811–818, July 1981, the differential equations for the electromagnetic fields in each layer have homogeneous solutions with coefficients and factors that are only dependent on intra-layer parameters and incident-radiation parameters. As with the case of on-axis incidence, intra-layer calculations are pre-calculated and cached. In computing the diffracted reflectivity from a periodic grating, cached calculation results for intra-layer parameters corresponding to the layers of the periodic grating, and incident-radiation parameters corresponding to the radiation incident on the periodic grating, are retrieved for use in constructing a boundary-matched system matrix equation in a manner analogous to that described above.

It is also important to understand that, although the present invention has been described in terms of its application to the rigorous coupled-wave method of calculating the diffraction of radiation, the method of the present invention may be applied to any diffraction calculation where the system is divided into layers, and where intermediate calculation results are only dependent on intra-layer variables. In such case the intermediate, intra-layer calculations may be pre-computed and cached. For instance, the diffraction calculation may be an approximate method, and/or it may use any of the formulations mentioned in the Background of the Invention section, such as integral formulations, or any other formulations, such as those mentioned in standard texts such as Solid State Physics, N. W. Ashcroft and N. D. Mermin, Saunders College, Philadelphia, 1976, pages 133–134, or Optical Properties of Thin Solid Films, O. S. Heavens, Dover Publications, Inc., New York, 1991, or Ellipsometry and Polarized Light, R. M. A. Azzam and N. M. Bashara, North-Holland Personal Library, Amsterdam, 1987. Furthermore, the present invention may be applied to diffraction calculations based on decompositions or analyses other than Fourier analysis, such as a decomposition into Bessel functions, Legendre polynomials, wavelets, etc. More generally, the method of the present invention may be applied to any diffraction calculation where the system is divided into sections, and where intermediate calculation results are only dependent on intra-section variables. Again, the intermediate, intra-section calculations may be pre-computed and cached. For instance, for a two-dimensionally periodic structure, the sections may be a regular array of blocks or cubes. Still more generally, the method of the present invention may be applied to any calculation where the system is divided into sections, and where intermediate calculation results are only dependent on intra-sections variables. Again, the intermediate, intra-section calculations may be pre-computed and cached.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many other variations are also to be considered within the scope of the present invention. For instance: the calculation of the present specification is applicable to circumstances involving conductive materials, or non-conductive materials, or both, and the application of the method of the present invention to periodic gratings which include conductive materials is considered to be within the scope of the present invention; once the eigenvectors and eigenvalues of a wave-vector matrix [A] are calculated and cached, intermediate results, such as the permittivity, inverse permittivity, permittivity harmonics, inverse-permittivity harmonics, permittivity harmonics matrix, the inverse-permittivity harmonics matrix, and/or the wave-vector matrix [A] need not be stored; the compound matrix [V], which is equal to the product of the eigenvector matrix and the root-eigenvalue matrix, may be calculated when it is needed, rather than cached; the eigenvectors and eigenvalues of the matrix [A] may be calculated using another technique; a range of an intra-layer parameter or an incident-radiation parameter may consist of only a single value; the grid of regularly-spaced layer-property values and/or incident-radiation values for which the matrices, eigenvalues and eigenvectors are cached may be replaced with a grid of irregularly-spaced layer-property values and/or incident-radiation values, or a random selection of layer-property values and/or incident-radiation values; the boundary-matched system equation may be solved for the diffracted reflectivity and/or the diffracted transmittance using any of a variety of matrix solution techniques; the "ridges" and "troughs" of the periodic grating may be ill-defined; a one-dimensionally periodic structure in a layer may include more than two materials; the method of the present invention may be applied to gratings having two-dimensional periodicity; a two-dimensionally periodic structure in a layer may include more than two materials; the method of the present invention may be applied to any polarization which is a superposition of TE and TM polarizations; the ridged structure of the periodic grating may be mounted on one or more layers of films deposited on the substrate; the method of the present invention may be used for diffractive analysis of lithographic masks or reticles; the method of the present invention may be applied to sound incident on a periodic grating; the method of the present invention may be applied to medical imaging techniques using incident sound or electromagnetic waves; the method of the present invention may be applied to assist in real-time tracking of fabrication processes; the gratings may be made by ruling, blazing or etching; the grating may be periodic on a curved surface, such as a spherical surface or a cylindrical surface, in which case expansions other than Fourier expansions would be used; the method of the present invention may be utilized in the field of optical analog computing, volume holographic gratings, holographic neural networks, holographic data storage, holographic lithography, Zernike's phase contrast method of observation of phase changes, the Schlieren method of observation of phase changes, the central dark-background method of observation, spatial light modulators, acousto-optic cells, etc. In summary, it is intended that the scope of the present invention be defined by the claims appended hereto and their equivalents.

What is claimed is:

1. A method of generating a library of simulated-diffraction signals for an integrated circuit periodic grating, comprising:

generating sets of intermediate layer data,
wherein each set of intermediate layer data corresponds to a separate one of a plurality of hypothetical layers of a hypothetical profile of the periodic grating, and
wherein each separate hypothetical layer has one of a plurality of possible combinations of hypothetical values of properties for that hypothetical layer;
storing the generated sets of intermediate layer data; and
generating simulated-diffraction signal, for each of a plurality of hypothetical profiles based on the stored generated sets of intermediate layer data.

2. The method of claim 1, wherein generating sets of intermediate layer data comprise:
for each, hypothetical layer:
setting permittivity parameters;
computing a wave-vector matrix, the wave vector matrix being based on the permittivity parameters for the hypothetical layer; and
computing characteristic parameter for the wave-vector matrix computed for the hypothetical layer,
wherein the intermediate layer data for each hypothetical layer includes the characteristic parameters for the wave-vector matrix for that hypothetical layer.

3. The method of claim 2, wherein generating sets of intermediate layer data comprise:
for each hypothetical layer:
setting incident-radiation parameter,
wherein the wave-vector matrix is based on the incident-radiation parameter.

4. The method of claim 1, wherein generating sets of intermediate layer data comprise:
for each set of intermediate layer data:
computing at least one of:
permittivity parameters including a permittivity, harmonic components of the permittivity, and a permittivity harmonics matrix; and
inverse-permittivity parameters including in inverse-permittivity, harmonic components of the inverse-permittivity, and an inverse-permittivity harmonica matrix;
computing a wave-vector matrix; and
computing eigenvectors and eigenvalues of the wave-vector matrix to form an eigenvector matrix, a root-eigenvalue matrix and a compound matrix,
wherein the stored intermediate layer data includes the wave-vector matrix corresponding to that intermediate layer data.

5. The method of claim 4, wherein generating simulated-diffraction signals comprises:
for each hypothetical profile:
constructing a matrix equation from the stored intermediate layer data corresponding to the hypothetical layers of the hypothetical profile, the matrix equation being a function of the stored eigenvector matrices, the computed root-eigenvalue matrices and the compound matrix;
solving the constructed matrix equation to determine a diffracted reflectivity value Ri for each harmonic order i; and
using the determined diffracted reflectivity values Ri to generate the simulated-diffraction signal for the hypothetical profile.

6. The method of claim 1, wherein generating simulated-diffraction signals for each of a plurality of hypothetical profiles comprises:
constructing a matrix equation from the stored intermediate data corresponding to the hypothetical layers of the hypothetical profile; and
solving the constructed matrix equation to determine diffracted reflectivity values for the hypothetical profile.

7. The method of claim 1, wherein generating simulated-diffraction signals for each of a plurality of hypothetical profile comprises:
performing rigorous coupled-wave analysis on the saved intermediate data corresponding to the hypothetical layers of the hypothetical profile.

8. The method of claim 1, wherein storing the generated sets of intermediate layer data comprises:
storing the intermediate layer data within a cache.

9. The method of claim 8, wherein the cache resides in a computer memory.

10. The method of claim 1, wherein generating simulated-diffraction signals comprises:
characterizing the shape of a hypothetical profile for the periodic grating with a set of profile parameter; and
varying the set of profile parameters to generate the plurality of hypothetical profiles.

11. The method of claim 1, wherein generating simulated-diffraction signals comprise:
for each hypothetical profile,
retrieving the one or more stored intermediate layer data that charactetizes the hypothetical profile; and
applying boundary conditions to generate a simulated-diffraction signal for the hypothetical profile.

12. The method of claim 11 further comprising:
pairing each hypothetical profile with the simulated-diffraction signal generated for that hypothetical profile, and
storing the hypothetical profile and simulated-diffraction signal pair.

13. The method of claim 12, wherein the hypothetical profile and simulated-diffraction signal pair is stored in a computer-readable medium.

14. A method of generating a library of simulated-diffraction signals for an integrated circuit periodic grating, comprising:
generating sets of intermediate layer data,
wherein each set of intermediate layer data corresponds to one of a plurality of hypothetical layers of a hypothetical profile of the periodic grating;
storing the sets of intermediate layer data;
generating simulated-diffraction signals for a plurality of hypothetical profiles of the periodic grating based on the stored intermediate layer data; and
storing the simulated-diffraction signals.

15. The method of claim 14,
wherein generating sets of intermediate layer data comprises computing a wave-vector matrix for each set of intermediate layer data, and
wherein storing the sets of intermediate layer data comprises storing the wave-vector matrix generated for each set of intermediate layer data.

16. The method of claim 14, wherein generating simulated-diffraction signals comprises:
constructing a matrix equation from the stored intermediate layer data corresponding to the hypothetical layers of the hypothetical profile; and solving the constructed matrix equation to determine diffracted reflectivity values for the hypothetical profile.

17. The method of claim 14, wherein generating simulated-diffraction signals comprises:
charaterizing the shape of a hypothetical profile of the periodic grating with a set of profile parameters; and
varying the set of profile parameters to generate the plurality of hypothetical profiles.

18. The method of claim 17, wherein storing the simulated-diffraction signal comprises:
pairing each hypothetical profile with the simulated-diffraction signal generated for that hypothetical profile; and
storing the hypothetical profile and simulated-diffraction signal pair.

19. The method of claim 14, wherein the intermediate layer data are stored in a computer memory, and wherein the simulated-diffraction signals are stored computer-readable medium.

20. The method of claim 14 comprising:
illuminating a portion of a semiconductor wafer with incident radiation
measuring a diffraction signal from the radiation diffracted from the portion of the semiconductor wafer; and
matching the measured diffraction signal with one of the stored simulated-diffraction signals.

21. The method of claim 20, wherein the incident radiation includes light having a plurality of wavelengths, and wherein the portion of the wafer is illuminated from a single angle.

22. The method of claim 20, wherein the incident radiation includes light having a single wavelength, and wherein the portion of the wafer is illuminated from a plurality of angles.

23. A computer readable medium having a library of simulated-diffraction signals generated in accordance with the method of claim 14.

24. A method of using a library of simulated-diffraction signals to determine the profile of a periodic grating, the method comprising:
illuminating a portion of a semiconductor wafer with incident radiation;
measuring a diffraction signal from the radiation diffracted from the portion of the semiconductor wafer; and
matching the measured diffraction signal with one of a plurality of simulated-diffraction signals stored in a library of simulated-diffraction signals,
wherein the library of simulated-diffraction signals was generated in advance in accordance with the method of claim 14.

25. A method of generating and using a library of simulated-diffraction signals of a periodic grating, the method comprising:
generating sets of intermediate layer data,
wherein each set of intermediate layer data corresponds to one of a plurality of hypothetical layers of a hypothetical profile of the periodic grating;
storing the sets of intermediate layer data;
generating simulated-diffraction signals for a plurality of hypothetical profiles of the periodic grating based on the stored intermediate layer data;
storing the simulated-diffraction signals;

illuminating a portion of a semiconductor wafer with incident radiation;
measuring a diffraction signal from the radiation diffracted from the portion of the semiconductor wafer; and
matching the measured diffraction signal with one of the stored simulated-diffraction signals.

26. A system for generating a library of simulated-diffraction signals for a periodic grating, comprising:
a processor configured to generate sets of intermediate layer data,
wherein each set of intermediate layer data corresponds to a hypothetical layer of a hypothetical profile of the periodic grating;
a memory configured to store the sets of intermediate layer data; and
wherein the processor is further configured to:
generate simulated-diffraction signals for a set of hypothetical profiles of the periodic grating based on the intermediate layer data stored in the memory.

27. The system of claim 26, wherein the processor is further configured to compute a wave-vector matrix for each set of intermediate layer data, and wherein the wave-vector matrix is stored in the memory.

28. The system of claim 26, wherein the processor is further configured to:
construct a matrix equation from the stored intermediate layer data corresponding to the hypothetical layers of a hypothetical profile; and
solve the constructed matrix equation to determine diffraction reflectivity values for the hypothetical profile.

29. The system of claim 26 further comprising:
a computer-readable medium configured to hold the generated simulated-diffraction signals.

30. A computer-readable storage medium containing computer executable instructions for causing a computer to generate a library of simulated-diffraction signals of a periodic grating, comprising instructions for:
generating sets of intermediate layer data,
wherein each set of intermediate layer data corresponds to one of a plurality of hypothetical layers of a hypothetical profile;
storing the sets of intermediate layer data;
generating simulated-diffraction signals for a plurality of hypothetical profiles of the periodic grating based on the stored intermediate layer data; and
storing the simulated-diffraction signals.

31. The computer-readable storage medium of claim 30, wherein generating sets of intermediate layer data comprises computing a wave-vector matrix for each set of intermediate layer data, and
wherein storing the sets of intermediate layer data comprises storing the wave-vector matrix generated for each set of intermediate layer data.

32. The computer-readable storage medium of claim 30, wherein generating simulated-diffraction signal, comprises:
constructing a matrix equation from the stored intermediate layer data corresponding to the hypothetical layers of the hypothetical profile; and
solving the constructed matrix equation to determine diffracted reflectivity values for the hypothetical profile.

* * * * *